US008003740B2

(12) United States Patent  (10) Patent No.: US 8,003,740 B2
Mihan et al.                (45) Date of Patent:     Aug. 23, 2011

(54) METHOD OF CONTROLLING THE RELATIVE ACTIVITY OF THE DIFFERENT ACTIVE CENTERS OF HYBRID CATALYSTS

(75) Inventors: Shahram Mihan, Bad Soden (DE); Rainer Karer, Kaiserslautern (DE); Harald Schmitz, Weinheim (DE); Dieter Lilge, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 766 days.

(21) Appl. No.: 11/989,352

(22) PCT Filed: Jul. 13, 2006

(86) PCT No.: PCT/EP2006/006857
§ 371 (c)(1),
(2), (4) Date: Jan. 24, 2008

(87) PCT Pub. No.: WO2007/012406
PCT Pub. Date: Feb. 1, 2007

(65) Prior Publication Data
US 2010/0130708 A1    May 27, 2010

Related U.S. Application Data

(60) Provisional application No. 60/710,294, filed on Aug. 22, 2005.

(30) Foreign Application Priority Data

Jul. 26, 2005 (DE) .......................... 10 2005 035 477

(51) Int. Cl.
C08F 4/70 (2006.01)
C08F 4/64 (2006.01)
C08F 4/80 (2006.01)
C08F 4/76 (2006.01)

(52) U.S. Cl. ........ 526/117; 526/113; 526/114; 526/115; 526/116; 526/91; 526/161; 526/160; 526/172; 526/170; 526/943; 526/169.1

(58) Field of Classification Search .................. 526/942, 526/43, 161, 170, 113, 91, 117
See application file for complete search history.

(56) References Cited

U.S. PATENT DOCUMENTS

| 3,242,150 | A |   | 3/1966  | Scoggin |
| 3,248,179 | A |   | 4/1966  | Norwood |
| 5,068,489 | A |   | 11/1991 | Edwards et al. |
| 5,525,678 | A | * | 6/1996  | Mink et al. ............ 525/246 |
| 5,527,752 | A |   | 6/1996  | Reichle et al. |
| 5,608,019 | A |   | 3/1997  | Cheruvu et al. |
| 5,650,722 | A |   | 7/1997  | Smith et al. |
| 5,698,642 | A |   | 12/1997 | Govoni et al. |
| 5,955,555 | A |   | 9/1999  | Bennett |
| 5,965,675 | A | * | 10/1999 | Kellum et al. ............ 526/82 |
| 6,075,103 | A |   | 6/2000  | Marks et al. |
| 6,087,291 | A |   | 7/2000  | Speca et al. |
| 6,194,341 | B1 | * | 2/2001 | Canich et al. ............ 502/113 |
| 6,207,606 | B1 |   | 3/2001 | Lue et al. |
| 6,214,761 | B1 |   | 4/2001 | Bennett |
| 6,255,418 | B1 |   | 7/2001 | Jolly et al. |
| 6,277,778 | B1 |   | 8/2001 | Leino et al. |
| 6,281,306 | B1 | * | 8/2001 | Oskam et al. ............ 526/161 |
| 6,413,477 | B1 |   | 7/2002 | Govoni et al. |
| 6,417,305 | B2 |   | 7/2002 | Bennett |
| 6,423,848 | B2 |   | 7/2002 | Bennett |
| 6,432,862 | B1 |   | 8/2002 | Bennett |
| 6,462,149 | B1 |   | 10/2002 | Tilston et al. |
| 6,465,386 | B1 |   | 10/2002 | Maddox et al. |
| 6,492,472 | B2 |   | 12/2002 | Lue et al. |
| 6,573,343 | B1 |   | 6/2003 | Follestad |
| 6,583,237 | B1 |   | 6/2003 | Imuta et al. |
| 6,589,905 | B1 |   | 7/2003 | Fischer et al. |
| 6,610,799 | B1 |   | 8/2003 | Follestad et al. |
| 6,630,547 | B1 |   | 10/2003 | Lynch et al. |
| 6,657,026 | B1 |   | 12/2003 | Kimberley et al. |
| 6,689,845 | B1 |   | 2/2004 | Govoni et al. |
| 6,784,261 | B1 |   | 8/2004 | Schopf et al. |
| 6,812,185 | B2 |   | 11/2004 | Fischer et al. |
| 6,818,187 | B2 |   | 11/2004 | Govoni et al. |
| 6,828,395 | B1 | * | 12/2004 | Ehrman et al. ............ 526/114 |

(Continued)

FOREIGN PATENT DOCUMENTS

DE       19710615       9/1998

(Continued)

OTHER PUBLICATIONS

J. Michl, Editor, *Chemical Reviews*, vol. 100(4), p. 1167-1681 (2000). L. Fieser & M. Fieser, "Kapitel 33, Heterocyclen;" *Lehrbuch der Organischen Chemie*; p. 921-941 (1957) Verlag Chemie.

H. Wiesenfeldt et al., *ansa*-Metallocene derivatives. XVII. Racemic and *meso* diastereomers of group IV metallocene derivatives with symmetrically substituted, dimethylsilanediyl-bridged ligand frameworks. Crystal structure of $R,S-Me_2Si(3-t-Bu-5-MeC_5H_2)_2ZrCl_2$; *Journal of Organometallic Chemistry*, vol. 69 p. 359-370 (1989).

P. Jutzi et al., "Cyclopentadienyl compounds with nitrogen donors in the side-chain," *Journal of Organometallic Chemistry*, vol. 500, p. 175-185 (1995).

M. Enders et al., "8-Quinolycyclopentadienyl, a Ligand with a Tailored Fit for Chelate Complexes," *Chem. Ber.*, vol. 129, p. 459-463 (1996).

J. Randall, "A Review of High Resolution Liquid$^{13}$ Carbon Nuclear Magnetic Resonance Characterizations of Ethylene-Based Polymers," *JMS-Rev. Macromol. Chem. Phys.*, C29(2&3), p. 201-317 (1989).

*Primary Examiner* — Rip A. Lee

(74) *Attorney, Agent, or Firm* — Dilworth IP, LLC

(57) ABSTRACT

Method of preparing olefin polymers, which comprises the polymerization of at least one α-olefin in the presence of a hybrid catalyst to produce a polymer comprising at least a higher molecular weight polymer component and a lower molecular weight polymer component in the presence of water in an amount of from 2 to 100 mol ppm and/or carbon dioxide in an amount of from 2 to 100 mol ppm, in each case based on the total reaction mixture, in order to alter the ratio of the higher molecular weight polymer component to the lower molecular weight polymer component. This enables the ratio of the higher molecular weight component to the lower molecular weight component to be controlled selectively.

15 Claims, 1 Drawing Sheet

U.S. PATENT DOCUMENTS

| | | |
|---|---|---|
| 6,833,416 B2 * | 12/2004 | Kinnan et al. .................. 526/82 |
| 6,875,828 B2 | 4/2005 | Kuo et al. |
| 6,962,890 B2 | 11/2005 | Matsukawa et al. |
| 6,995,219 B2 | 2/2006 | Follestad et al. |
| 7,045,644 B2 | 5/2006 | Schopf et al. |
| 7,053,160 B1 | 5/2006 | Bingel et al. |
| 7,148,304 B2 | 12/2006 | Kimberley et al. |
| 7,199,195 B2 | 4/2007 | Barry et al. |
| 7,238,818 B2 | 7/2007 | Ewen et al. |
| 7,345,129 B2 | 3/2008 | Kimberley et al. |
| 7,459,509 B2 | 12/2008 | Barry et al. |
| 7,601,783 B2 * | 10/2009 | Davis et al. .................. 525/191 |
| 7,737,230 B2 * | 6/2010 | Mihan et al. .................. 526/72 |
| 2002/0037979 A1 | 3/2002 | Job et al. |
| 2008/0039606 A9 | 2/2008 | Barry et al. |
| 2008/0200622 A1 | 8/2008 | Mihan et al. |

FOREIGN PATENT DOCUMENTS

| | | |
|---|---|---|
| EP | 435250 | 7/1991 |
| EP | 1013674 | 6/2000 |
| EP | 1092730 | 4/2001 |
| EP | 1 403 288 A1 * | 3/2004 |
| FI | 960437 | 7/1997 |
| WO | 91/09882 | 7/1991 |
| WO | 95/13305 | 5/1995 |
| WO | 96/00243 | 1/1996 |
| WO | 96/09328 | 3/1996 |
| WO | 97/04015 | 2/1997 |
| WO | 97/42516 | 11/1997 |
| WO | 98/02247 | 1/1998 |
| WO | 98/22486 | 5/1998 |
| WO | 98/27124 | 6/1998 |
| WO | 98/40419 | 9/1998 |
| WO | 98/56835 | 12/1998 |
| WO | 99/46302 | 9/1999 |
| WO | 99/60032 | 11/1999 |
| WO | 00/02929 | 1/2000 |
| WO | 00/05277 | 2/2000 |
| WO | 00/31090 | 6/2000 |
| WO | 00/35970 | 6/2000 |
| WO | 00/50466 | 8/2000 |
| WO | 00/55216 | 9/2000 |
| WO | 01/09148 | 2/2001 |
| WO | 01/48029 | 7/2001 |
| WO | 02/24768 | 3/2002 |
| WO | 02/046249 | 6/2002 |
| WO | 02/090393 | 11/2002 |
| WO | 02/090398 | 11/2002 |
| WO | 03/040201 | 5/2003 |
| WO | 03/104290 | 12/2003 |
| WO | 2005/124324 | 12/2005 |

* cited by examiner

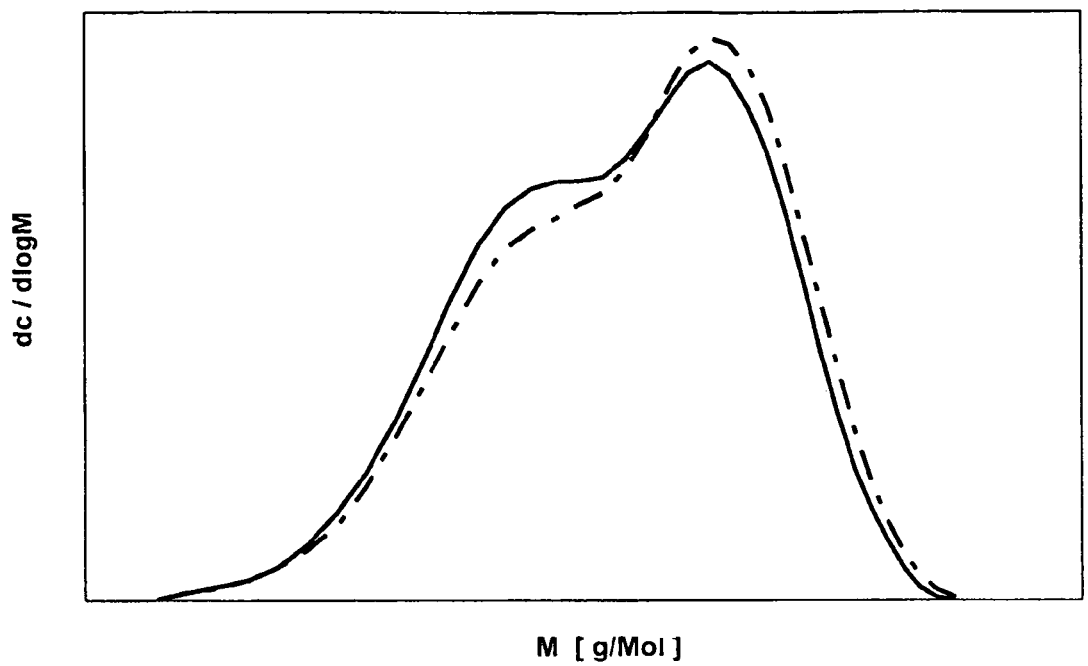
Fig

METHOD OF CONTROLLING THE RELATIVE ACTIVITY OF THE DIFFERENT ACTIVE CENTERS OF HYBRID CATALYSTS

The present invention relates to methods of polymerizing olefins using hybrid catalysts and also methods of controlling the relative activity of the active centers of such hybrid catalysts.

To improve the property profile of polyolefins, it is being increasingly found to be necessary to achieve precise control of the molecular composition of the polyolefins. A significant step forward in this direction has been the development of single-site catalysts in which only one type of catalytically active center is present. The polymers obtained using such catalysts have a relatively uniform distribution of the polymer chains in respect of the molar mass, the comonomer distribution and, if appropriate, the stereoregularity. However, for many applications it is not advantageous to use very uniform polymers.

One possible way of preparing monomers having relatively broad distributions in a targeted manner is to mix different, separately prepared, uniform polymers with one another. A further possible way which is frequently used on an industrial scale for polyolefins is to produce the polymers in a multi-stage polymerization process (cascade), with polymerization being carried out under different conditions in the different stages. In this way, too, it is possible to produce polymers having relatively broad distributions in a targeted manner.

However, for economic reasons and also with a view to wider availability of such reactors, efforts have been made for some time to prepare polymers having broader distributions even in continuous processes using a single reactor. To achieve this objective, catalyst mixtures or catalysts having different active centers, known as hybrid catalysts, have frequently been described in the prior art. Hybrid catalysts can be catalysts which comprise active centers of different classes of catalysts. Thus, for example, WO 98/02247 and WO 01/48029 describe hybrid catalysts comprising a Ziegler component and a metallocene component. For the purposes of the present patent application, the expression Ziegler catalyst also includes the catalysts referred to as Ziegler-Natta catalysts in the literature. The document WO 00/35970 relates to methods of preparing polyolefins using catalysts comprising metallocene centers and chromium oxide centers. WO 99/46302 discloses catalysts comprising nitrogen-comprising transition metal complexes and further catalysts, for example Ziegler, chromium oxide or metallocene catalysts, for the polymerization of olefins. However, hybrid catalysts can also be catalysts comprising different representatives of the same class of active centers. Thus, for example, WO 99/60032 describes hybrid catalysts which comprise two different metallocenes and by means of which polyolefins having improved processability can be obtained. Such known hybrid catalysts usually comprise at least one component derived from a transition metal coordination compound.

However, in the continuous polymerization of olefins using hybrid catalysts in a single reactor, there is the problem that the properties of the polymers obtained depend not only on the polymerization conditions but also significantly on the ratio of the active centers present. Fluctuations in the composition of different batches of hybrid catalysts used can thus lead to different proportions of the polymer components formed by the individual catalyst components. Aging processes of the catalysts, in particular if one of the components is more sensitive than the other(s), can also result in different products even when the same batch is used. Fluctuations of the polymerization conditions can also influence the activity of the catalyst components used in different ways, so that different proportions of the polymer components formed by the individual catalyst components can also result. There is therefore a great need, in particular in the case of hybrid catalysts, for ways of controlling the composition of the polymers formed.

Various approaches have been tried in order to solve this problem. Thus, WO 00/50466 and WO 02/24768 describe polymerization processes using hybrid catalysts, in each of which two different hybrid catalysts are introduced into a reactor, with the two hybrid catalysts comprising the same catalyst components but in a different ratio. The ratio of the polymer components formed to one another can then be controlled by regulating the ratio of the two hybrid catalysts. However, to achieve this it is necessary to install two different metering systems on one reactor and regulate these relative to one another and also to produce and keep available two different catalyst solids for each polymer type produced.

A different approach is described by WO 02/090398, in which a hybrid catalyst and an auxiliary selected from the group consisting of phosphines, phosphites, acetylenes, dienes, thiophenes and aluminum alkyls are used to influence firstly the molar mass of the higher molecular weight and lower molecular weight polymer components formed by the individual active centers relative to one another and secondly the ratio of the polymer components to one another. However, the influencing of the ratio of the polymer components to one another occurs successfully only with a simultaneous change in the molar mass of the components. This has the disadvantage that the higher molecular weight component or the lower molecular weight component is altered in an undesirable way and therefore scarcely gives predictable results.

It is also worthy of note that carbon dioxide as described in WO 02/090398 has only a small effect on the ratio of the higher molecular weight component to the lower molecular weight component and therefore appears unsuitable.

In the case of catalysts based on only a single metallocene complex, it is also known that the properties of the polymers formed in the polymerization of olefins can be influenced by addition of auxiliaries. Auxiliaries which may be mentioned are, in particular, chain transfer agents which are used quite generally for regulating the mean molar mass of the polymer chains formed. Apart from hydrogen as the most widespread molar mass regulator, dialkylzinc compounds, as described in EP-A 435 250 and EP-A 1 092 730 or various silanes as described in EP-A 1 092 730, WO 98/56835 and WO 03/104290 can be employed for controlling the molar mass. The use of carbon dioxide and water for increasing or decreasing the molar mass is described in WO 95/13305 in the context of the use of metallocene catalysts.

For this reason, there continues to be a need to find ways of controlling the proportions of the polymer components formed by the various active centers in a simple fashion in the continuous polymerization of olefins using hybrid catalysts, in particular in a single reactor, with the further properties of the polymer chains formed being influenced as little as possible.

It was accordingly an object of the present invention to overcome the above-mentioned disadvantages of the prior art and provide methods by means of which it is possible to control the ratio of the polymer components formed by the various active centers of the catalyst components by addition of suitable modifiers when using hybrid catalysts, without the properties of the fractions formed altering substantially or the activity of the other catalyst components being reduced to a major extent, and thus to compensate fluctuations in the polymer conditions and the composition of the hybrid catalysts used in a targeted manner in order to produce products having a constant quality.

The present invention accordingly provides a method of preparing olefin polymers, which comprises the polymerization of at least one α-olefin in the presence of a hybrid catalyst to produce a polymer comprising at least a higher molecular weight polymer component and a lower molecular weight polymer component in the presence of water in an amount of from 2 to 100 mol ppm and/or carbon dioxide in an amount of from 2 to 100 mol ppm, in each case based on the total reaction mixture. Water and/or carbon dioxide are added in order to alter the ratio of the higher molecular weight polymer component to the lower molecular weight polymer component.

The addition of water or carbon dioxide in the olefin polymerization when using hybrid catalysts makes it possible, in contrast to the use of catalysts having only one catalyst component, to regulate the activity of the individual components in a targeted manner without having a substantial influence on the molar masses or molar mass distributions of the individual components.

The present invention further provides a method of polymerizing olefins using hybrid catalysts comprising at least two different catalyst components of which at least one is a transition metal coordination compound, with the polymerization being carried out in the presence of water in an amount of from 2 to 100 mol ppm and/or in the presence of carbon dioxide in an amount of from 2 to 100 mol ppm, in each case based on the total reaction mixture.

The present invention further provides a method of controlling the ratio of a higher molecular weight component to a lower molecular weight component in an olefin polymer, which comprises the polymerization of at least one α-olefin at temperatures of from 50 to 130° C. and pressures of from 0.1 to 150 MPa in the presence of a hybrid catalyst, wherein carbon dioxide is used in an amount of from 2 to 100 mol ppm to reduce the proportion of the higher molecular weight component and/or water is used in an amount of from 2 to 100 mol ppm to reduce the proportion of the lower molecular weight component, with the amount in mol ppm being based in each case on the total reaction mixture.

It may be emphasized that further polymer components in addition to the higher molecular weight component and the lower molecular weight component can also be present in the polymer product. The critical aspect is merely that the proportion of at least two components relative to one another is controlled or regulated. The polymer preferably has two, three or four, particularly preferably two or three, polymer components.

The control can preferably also be part of a regulating procedure. The present invention therefore further provides a method of regulating the ratio of a higher molecular weight polymer component to a lower molecular weight polymer component in an olefin polymer using the above-mentioned control method, which comprises the steps measurement of the ratio of the higher molecular weight polymer component to the lower molecular weight polymer component in the polymer product, calculation of the amount of carbon dioxide necessary to achieve a prescribed ratio when the measured ratio is greater than the prescribed ratio, or calculation of the amount of water necessary to achieve the prescribed ratio when the measured ratio is smaller than the prescribed ratio, introduction of the calculated amount of water or carbon dioxide into the reaction mixture.

To measure the ratio of the higher molecular weight polymer component to the lower molecular weight polymer component, the rapid determination of the determination by means of NMR, as is described in the international patent application PCT/EP05/052683, is particularly suitable.

Here, the composition of a polymer mixture in a polymerization reactor is preferably measured by means of the steps
 (a) recording of at least one $^1$H-NMR relaxation curve of the polymer mixture and
 (b) calculation of the proportions of the polymer components by comparison of the measured relaxation curve with the relaxation curves of the individual polymer components.

The control or regulation of the modifiers can also be carried out in combination with the regulation of one or more of the catalyst components introduced into the reactor.

The particularly selective method of setting the activity of the catalyst components by means of the present invention in combination with the rapid determination of the polymer composition by means of NMR makes particularly simple, rapid and reliable regulation of the polymer composition possible.

Finally, the present invention provides for the use of carbon dioxide for decreasing the ratio of a higher molecular weight component to a lower molecular weight component in an olefin polymer during the polymerization of at least one α-olefin in the presence of a hybrid catalyst comprising a catalyst component based on iron or cobalt and a catalyst component comprising a cyclopentadienyl ligand, and also the use of water for increasing the ratio of a higher molecular weight component to a lower molecular weight component in an olefin polymer during the polymerization of at least one α-olefin in the presence of a hybrid catalyst comprising a catalyst component based on iron or cobalt and a catalyst component comprising a cyclopentadienyl ligand.

According to the invention, the polymerization takes place in the presence of water in an amount of from 2 to 100 mol ppm or carbon dioxide in an amount of from 2 to 100 mol ppm, in each case based on the total reaction mixture. Water and carbon dioxide are preferably used individually, but can also be used together. Carbon dioxide and water will hereinafter also be referred to collectively or individually as modifiers.

The amount of water or carbon dioxide added serves to alter the ratio of the higher molecular weight polymer component to the lower molecular weight polymer component. Other properties of the polymer components, e.g. the mean molar mass, are not influenced or influenced to only a minor extent. The amount of the other polymer component in each case is not altered or altered to only a minor extent. It may be emphasized that further additives and auxiliaries such as antistatics or scavengers can additionally be used in the method of the invention.

The modifiers used according to the invention have the further advantage that they are readily available, cheap, odorless and completely nontoxic.

The precise amount of water or carbon dioxide used is dependent, in particular, on the sensitivity of the respective catalyst component in the hybrid catalyst toward the modifier and also the type and amount of scavengers such as metal alkyls added. It therefore needs to be matched empirically to the respective reaction conditions. The amount should in no event be so high that one or more catalyst components are made completely inactive, as is customary, for example, prior to shutdown of the reactor.

The water is preferably used in an amount of at least 3 mol ppm, more preferably at least 5 mol ppm, more preferably at least 8 mol ppm. It is preferably used in an amount of not more than 90 mol ppm, more preferably not more than 75 mol ppm, more preferably not more than 50 mol ppm. A preferred concentration range extends from 3 to 80 mol ppm, more preferably from 3 to 60 mol ppm, particularly preferably from 5 to 40 mol ppm.

The carbon dioxide is preferably used in an amount of at least 3 mol ppm, more preferably at least 5 mol ppm, more preferably at least 8 mol ppm. It is preferably used in an amount of not more than 90 mol ppm, more preferably not more than 75 mol ppm, more preferably not more than 50 mol ppm. A preferred concentration range extends from 3 to 80 mol ppm, more preferably from 3 to 60 mol ppm, particularly preferably from 5 to 40 mol ppm.

Apart from carbon dioxide and water, further modifiers which preferably have a different selectivity toward the catalyst components can also be present. The addition of further modifiers is particularly useful when the hybrid catalyst also comprises more than two components.

For the purposes of the present invention, hybrid catalysts are catalyst systems which comprise at least two different types of active centers derived from at least two chemically different starting materials. The different active centers can be active centers obtained from different transition metal coordination compounds. However, it is also possible to use active centers derived from Ziegler-Natta catalysts or catalysts based on chromium, e.g. Phillips catalysts.

By definition, the hybrid catalysts are suitable for producing bimodal or multimodal polymer products comprising at least a higher molecular weight polymer component and a lower molecular weight polymer component. A polymer is bimodal when it has two different polymer components, and a polymer is multimodal when it has more than two different polymer components. A polymer component is, logically, a polymer which has been produced by one specific type of active component in a polymerization catalyst comprising a plurality of components.

The hybrid catalysts used in the method of the invention can comprise mixtures of two or more different particulate catalyst solids. However, preference is given to using catalyst systems which comprise catalyst solids in which all types of active centers are present on one catalyst particle. Particular preference is given to using a plurality of catalyst components which have together been immobilized on a support.

In the method of the invention, preference is given to using hybrid catalysts in which at least two of the constituents of the hybrid catalysts resulting from the different transition metal components differ in terms of their comonomer incorporation behavior. These lead to polymer products in which the comonomer content of the higher molecular weight polymer component differs from that of the lower molecular weight polymer component, i.e. the catalyst components display different comonomer incorporation behavior. For the purposes of the present patent application, a different comonomer incorporation behavior is present when the comonomer content of the various polymer components differs by at least 30%. The comonomer content of the polymer components preferably differs by at least 50%, more preferably by a factor of 2, more preferably by a factor of 10, particularly preferably by a factor of 100.

In a preferred variant, the higher molecular weight polymer component is that having the higher comonomer content. In one embodiment, the lower molecular weight polymer component has a comonomer content of 0-1.5 mol %, preferably 0.08 mol %, particularly preferably 0-0.3 mol %. In a further embodiment, the higher molecular weight polymer component has a comonomer content of from 0 to 15 mol %, preferably from 0.01 to 10 mol %, particularly preferably from 0.3 to 3 mol %.

The lower molecular weight polymer component preferably has a mean molar mass $M_w$ of from 10 000 to 100 000 g/mol, more preferably from 20 000 to 80 000 g/mol, particularly preferably from 30 000 to 70 000 g/mol. The higher molecular weight polymer component preferably has a mean molar mass $M_w$ of from 100 000 to 2 000 000 g/mol, more preferably from 150 000 to 1 000 000 g/mol, particularly preferably 200 000-800 000 g/mol. Depending on product requirements, different combinations of amounts of the high molecular weight and low molecular weight components and molar masses of the components are chosen. The ratio of the higher molecular weight component to the lower molecular weight component is preferably from 5 to 95% by weight, more preferably from 10 to 90% by weight, particularly preferably from 20 to 80% by weight, in each case based on the sum of the higher and lower molecular weight components. It may be emphasized that further polymer components in addition to a higher molecular weight component and a low molecular weight component can be present in the polymer product.

To regulate the molar masses of the higher molecular weight polymer component and the lower molecular weight polymer component independently, the catalyst components preferably also have a differing response to molar mass regulators such as hydrogen.

The hybrid catalysts used in the inventive method of polymerizing olefins comprise at least two catalyst components. As catalyst components, it is in principle possible to use all compounds of the transition metals of groups 3 to 12 of the Periodic Table or the lanthanides which comprise organic groups and usually form active catalysts for olefin polymerization after reaction with a cocatalyst and, if appropriate, organometallic compounds. The catalyst components are usually compounds in which at least one monodentate or polydentate ligand is bound via sigma or pi bonds to the central atom. Possible ligands include both ligands comprising cyclopentadienyl radicals and ligands which are free of cyclopentadienyl radicals. Chem. Rev. 2000, Vol. 100, No. 4, describes many such compounds which are suitable for olefin polymerization. Furthermore, multinuclear cyclopentadienyl complexes are also suitable for olefin polymerization.

Suitable transition metal complexes are, in particular, complexes having at least one cyclopentadienyl-type ligand, with those having two cyclopentadienyl-type ligands generally being referred to as metallocene complexes. Particularly well-suited complexes are complexes of the general formula (I)

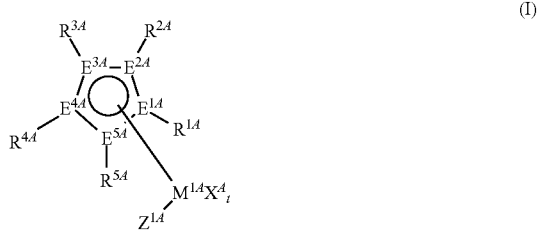

where the substituents and indices have the following meanings:
$M^{1A}$ is titanium, zirconium, hafnium, vanadium, niobium, tantalum, chromium, molybdenum or tungsten or an element of group 3 of the Periodic Table or the lanthanides, the radicals $X^A$ are identical or different and are each, independently of one another, fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 10 carbon atoms in the alkyl radical and from 6 to 20 carbon atoms in the aryl radical, —$OR^{6A}$ or —$NR^{6A}R^{7A}$, or two radicals $X^A$ are joined to one another and form, for example, a substituted or unsubstituted diene ligand, in particular a 1,3-diene ligand, or a biaryloxy group or form a ligand of the following group

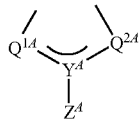

where
$Q^{1A}$ and $Q^{2A}$ are each O, $NR^{6A}$, $CR^{6A}R^{7A}$ or S and $Q^{1A}$ and $Q^{2A}$ are bound to $M^{1A}$,
$Y^A$ is C or S and
$Z^A$ is $OR^{6A}$, $SR^{6A}$, $NR^{6A}R^{7A}$, $PR^{6A}R^{7A}$, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 10 carbon atoms in the alkyl radical and from 6 to 20 carbon atoms in the aryl radical or
$E^{1A}$ to $E^{5A}$ are each carbon or not more than one $E^{1A}$ to $E^{5A}$ is phosphorus or nitrogen, preferably carbon,
t is 1, 2 or 3 and is such that, depending on the valence of $M^{1A}$, the complex of the general formula (I) is uncharged,
$R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, —$NR^{8A}_2$, —$N(SiR^{8A}_3)_2$, —$OR^{8A}$, —$OSiR^{8A}_3$, —$SiR^{6A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably 5-, 6- or 7-membered ring or a preferably 5-, 6- or 7-membered heterocycle which comprises at least one atom from the group consisting of N, P, O and S,
$R^{6A}$ and $R^{7A}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical or —$SiR^{8A}_3$, where the radicals $R^{6A}$ and $R^{7A}$ may also be substituted by halogens and/or two radicals $R^{6A}$ and $R^{7A}$ may also be joined to form a 5-, 6- or 7-membered ring,
the radicals $R^{6A}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_6$-$C_{10}$-aryloxy, where the radicals $R^{8A}$ may also be substituted by halogens and/or two radicals $R^{8A}$ may also be joined to form a 5-, 6- or 7-membered ring,
$Z^{1A}$ is as defined for $X^A$ or is

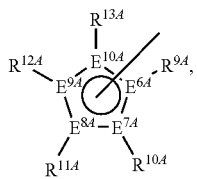

where the radicals
$R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl radical and 6-21 carbon atoms in the aryl radical, —$NR^{14A}_2$, —$N(SiR^{14A}_3)_2$, —$OR^{14A}$, —$OSiR^{14A}_3$ or —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably 5-, 6- or 7-membered ring or a preferably 5-, 6- or 7-membered heterocycle which comprises at least one atom from the group consisting of N, P, O or S, where
the radicals $R^{14A}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_5$-$C_{10}$-aryloxy, where the organic radicals $R^{14A}$ may also be substituted by halogens and/or two radicals $R^{14A}$ may also be joined to form a 5-, 6- or 7-membered ring, and
$E^{6A}$ to $E^{10A}$ are each carbon or not more than one $E^{6A}$ to $E^{10A}$ is phosphorus or nitrogen, preferably carbon,
or the radicals $R^{4A}$ and $Z^{1A}$ together form a —$R^{15A}_v$-$A^{1A}$- group in which
$R^{15A}$ is

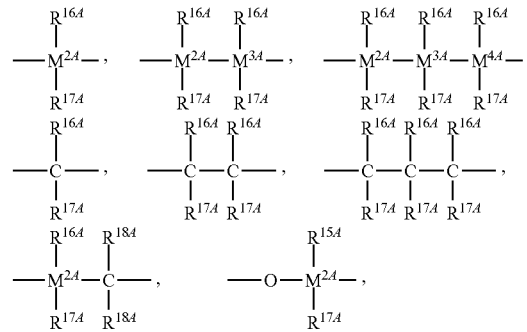

—$BR^{16A}$—, —$(BNR^{16A}R^{17A})$—, —$AlR^{16A}$—, —Ge—, —Sn—, —O—, —S—, —SO—, —$SO_2$—, =N—, —$NR^{16A}$—, —CO—, —$PR^{16A}$— or —$(POR^{16A})$—,
where
$R^{16A}$ to $R^{21A}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_6$-$C_{10}$-aryloxy, where the organic radicals $R^{16A}$-$R^{21A}$ may also be substituted by halogens and/or two radicals $R^{16A}$-$R^{21A}$ may also be joined to form a 5-, 6- or 7-membered ring, and
$M^{2A}$ to $M^{4A}$ are each silicon, germanium or tin, preferably silicon,
$A^{1A}$ is —O—, —S—, —$NR^{22A}$—, —$PR^{22A}$, —$OR^{22A}$, —$NR^{22A}_2$, —$PR^{22A}_2$
or an unsubstituted, substituted or fused, heterocyclic ring system, where
the radicals $R^{22A}$ are each, independently of one another, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical or $Si(R^{23A})_3$, where the organic radicals $R^{22A}$ may also be substituted by halogens and/or two radicals $R^{22A}$ may also be joined to form a 5-, 6- or 7-membered ring, $R^{23A}$ is hydrogen, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{23A}$ may also be substituted by halogens and/or two radicals $R^{23A}$ may also be joined to form a 5-, 6- or 7-membered ring, v is 1 or when $A^{1A}$ is an unsubstituted, substituted or fused heterocyclic ring system may be 1 or 0, or the radicals $R^{4A}$ and $R^{12A}$ together form a —$R^{15A}$— group.

The synthesis of such complexes can be carried out by methods known per se, with preference being given to reacting the appropriately substituted, cyclic hydrocarbon anions with halides of titanium, zirconium, hafnium or chromium.

Catalyst components based on the metal complexes mentioned are particularly suitable for producing the higher molecular weight polymer component. They are also particularly suitable for producing the polymer component having a relatively high comonomer content, particularly preferably as higher molecular weight component.

For the purposes of the present invention, alkyl is a linear or branched alkyl such as methyl, ethyl, n-propyl, isopropyl, n-butyl, isobutyl, tert-butyl, n-pentyl, n-hexyl, n-heptyl, n-octyl, n-nonyl or n-decyl. Alkenyl is a linear or branched alkenyl in which the double bond can be internal or terminal, e.g. vinyl, 1-allyl, 2-allyl, 3-allyl, 1-butenyl, 2-butenyl, 1-pentenyl or 1-hexenyl. $C_6$-$C_{40}$-Aryl is an unsubstituted, substituted or fused aryl system in which the aryl radical may be substituted by further alkyl groups and the aryl radical generally has from 6 to 20 carbon atoms and the alkyl radical generally has from 1 to 10 carbon atoms, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl. Arylalkyl is an aryl-substituted alkyl and may be substituted by further alkyl groups, e.g. benzyl, o-, m-, p-methylbenzyl, 1- or 2-ethylphenyl.

$A^{1A}$ together with the bridge $R^{R15A}$ can, for example, form an amine, ether, thioether or phosphine. However, $A^{1A}$ can also be an unsubstituted, substituted or fused, heterocyclic aromatic ring system which can comprise heteroatoms from the group consisting of oxygen, sulfur, nitrogen and phosphorus in addition to ring carbons. The 5-membered and 6-membered heteroaryl groups may also be substituted by $C_1$-$C_{10}$-alkyl, $C_5$-$C_{10}$-aryl, arylalkyl having from 1 to 10 carbon atoms in the alkyl radical and 6-10 carbon atoms in the aryl radical, trialkylsilyl or halogens such as fluorine, chlorine or bromine or be fused with one or more aromatics or heteroaromatics. Naming and numbering of the heterocycles has been taken from L. Fieser and M. Fieser, Lehrbuch der organischen Chemie, 3rd revised edition, Verlag Chemie, Weinheim 1957.

The radicals $X^A$ in the general formula (I) are preferably identical, preferably fluorine, chlorine, bromine, $C_1$-$C_7$-alkyl or arylalkyl, in particular chlorine, methyl or benzyl.

This type of complexes of the formula (I) also includes, for the purposes of the present invention, compounds having at least one ligand which is formed by a cyclopentadienyl or heterocyclopentadienyl with a fused-on heterocycle, with the heterocycles preferably being aromatic and comprising nitrogen and/or sulfur. Such compounds are described, for example, in WO 98/22486.

Among the complexes of the general formula (I), particular preference is given to those of the general formulae (Ia) to (Id)

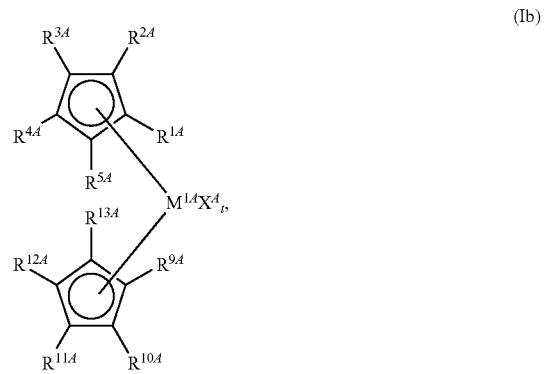

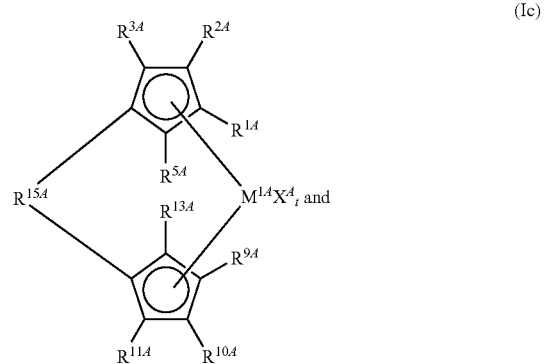

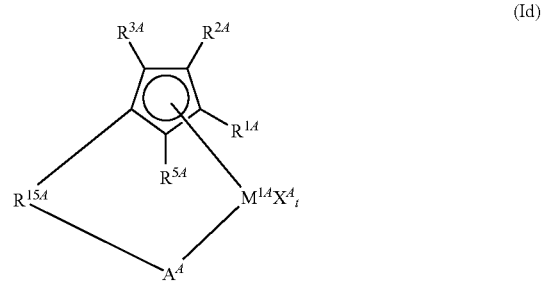

where the substituents and indices have the following meanings:

$M^{1A}$ is titanium, zirconium, hafnium, vanadium, niobium, tantalum, chromium, molybdenum or tungsten or an element of group 3 of the Periodic Table or the lanthanides, the radicals $X^A$ are identical or different and are each, independently of one another, fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 10 carbon atoms in the alkyl radical and from 6 to 20 carbon atoms in the aryl radical, —$OR^{6A}$ or —$NR^{6A}R^{7A}$, or two radicals $X^A$ are joined to one another and form, for example, a substituted or unsubstituted diene ligand, in particular a 1,3-diene ligand, or a biaryloxy group or form a ligand of the following group

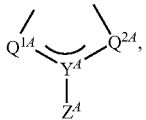

where
- $Q^{1A}$ and $Q^{2A}$ are each O, $NR^{6A}$, $CR^{6A}R^{7A}$ or S and $Q^{1A}$ and $Q^{2A}$ are bound to $M^{1A}$,
- $Y^A$ is C or S and
- $Z^A$ is $OR^{6A}$, $SR^{6A}$, $NR^{6A}R^{7A}$, $PR^{6A}R^{7A}$, hydrogen, $C_1$-$C_{10}$-alkyl, 5- to 7-membered cycloalkyl or cycloalkenyl, $C_2$-$C_{10}$-alkenyl, $C_6$-$C_{40}$-aryl, arylalkyl having from 1 to 10 carbon atoms in the alkyl radical and from 6 to 20 carbon atoms in the aryl radical or —$SiR^{8A}_3$,
- $E^{1A}$ to $E^{5A}$ are each carbon or not more than one $E^{1A}$ to $E^{5A}$ is phosphorus or nitrogen, preferably carbon,
- t is 1, 2 or 3 and is such that, depending on the valence of $M^{1A}$, the complex of the general formula (I) is uncharged,
- $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably 5-, 6- or 7-membered ring or a preferably 5-, 6- or 7-membered heterocycle which comprises at least one atom from the group consisting of N, P, O and S,
- $R^{6A}$ and $R^{7A}$ are each, independently of one another, $C_1$-$C_{10}$-alkyl, 5- to 7-membered cycloalkyl or cycloalkenyl, $C_2$-$C_{22}$-alkenyl, $C_5$-$C_{40}$-aryl, arylalkyl having from 1 to 10 carbon atoms in the alkyl radical and from 6 to 20 carbon atoms in the aryl radical or —$SiR^{8A}_3$, where the radicals $R^{6A}$ and $R^{7A}$ may also be substituted by halogens and/or two radicals $R^{6A}$ and $R^{7A}$ may also be joined to form a 5-, 6- or 7-membered ring,
- the radicals $R^{8A}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_6$-$C_{10}$-aryloxy, where the radicals $R^{8A}$ may also be substituted by halogens and/or two radicals $R^{8A}$ may also be joined to form a 5-, 6- or 7-membered ring,
- $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_5$-$C_{40}$-aryl, arylalkyl having from 1 to 16 carbon atoms in the alkyl radical and 6-21 carbon atoms in the aryl radical, —$NR^{14A}_2$, —$N(SiR^{14A}_3)_2$, —$OR^{14A}$, —$OSiR^{14A}_3$ or —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably 5-, 6- or 7-membered ring or a preferably 5-, 6- or 7-membered heterocycle which comprises at least one atom from the group consisting of N, P, O or S, where
- the radicals $R^{14A}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_6$-$C_{10}$-aryloxy, where the organic radicals $R^{14A}$ may also be substituted by halogens and/or two radicals $R^{14A}$ may also be joined to form a 5-, 6- or 7-membered ring, and
- $E^{6A}$ to $E^{10A}$ are each carbon or not more than one $E^{6A}$ to $E^{10A}$ is phosphorus or nitrogen, preferably carbon, or the radicals $R^{4A}$ and $Z^{1A}$ together form a —$R^{15A}_v$-$A^{1A}$- group in which

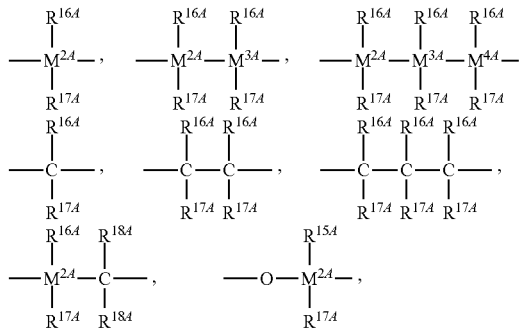

where
- $R^{16A}$ to $R^{21A}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_{10}$-alkoxy or $C_6$-$C_{10}$-aryloxy, where the organic radicals $R^{16A}$-$R^{21A}$ may also be substituted by halogens and/or two radicals $R^{16A}$-$R^{21A}$ may also be joined to form a 5-, 6- or 7-membered ring, and
- $M^{2A}$ to $M^{4A}$ are each silicon, germanium or tin, preferably silicon,
- $A^{1A}$ is —O—, —S—, —$NR^{22A}$—, —$PR^{22A}$—, —$OR^{22A}$, —$NR^{22A}_2$, —$PR^{22A}_2$ or an unsubstituted, substituted or fused, heterocyclic ring system, where
- the radicals $R^{22A}$ are each, independently of one another, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical or $Si(R^{23A})_3$, where the organic radicals $R^{22A}$ may also be substituted by halogens and/or two radicals $R^{22A}$ may also be joined to form a 5-, 6- or 7-membered ring,
- $R^{23A}$ is hydrogen, $C_1$-$C_{10}$-alkyl, 5- to 7-membered cycloalkyl, cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{23A}$ may also be substituted by halogens and/or two radicals $R^{23A}$ may also be joined to form a 5-, 6- or 7-membered ring,
- v is 1 or when $A^{1A}$ is an unsubstituted, substituted or fused heterocyclic ring system may be 1 or 0.

Among the complexes of the formula (Ia), particular preference is given to those in which
- $M^{1A}$ is titanium, zirconium or hafnium,
- the radicals $X^A$ are identical or different and are each, independently of one another, chlorine, $C_1$-$C_4$-alkyl, phenyl, alkoxy or aryloxy, a carboxylate of the formula —O—C(O)—$R^{6A}$ or a carbamate of the formula —O—C(O)—$NR^{6A}R^{7A}$,
- t is 1 or 2, preferably 2,
- $R^{1A}$ to $R^{5A}$ are each hydrogen or $C_1$-$C_6$-alkyl or two adjacent radicals $R^{1A}$ to $R^{5A}$ together with the atoms connecting them form a substituted or unsubstituted 5-, 6- or 7-membered ring, in particular a substituted or unsubstituted benzo group 6-membered ring, and $R^{6A}$ and $R^{7A}$ are each $C_1$-$C_{10}$-alkyl, $C_6$-$C_{40}$-aryl or arylalkyl having from 1 to 10 carbon atoms in the alkyl radical and from 6 to 20 carbon atoms in the aryl radical.

The preparation of such compounds (Ia) and particularly preferred embodiments of the compounds (Ia) are described, for example, in U.S. Pat. No. 5,527,752.

Among the unbridged metallocene complexes of the formula (Ib), preference is given to those in which $M^{1A}$ is zirconium, hafnium or chromium, $X^A$ is fluorine, chlorine, $C_1$-$C_4$-alkyl or benzyl, or two radicals $X^A$ form a substituted or unsubstituted diene ligand, t is zero in the case of chromium, otherwise 1 or 2 and preferably 2, $R^{1A}$ to $R^{5A}$ are each hydrogen, $C_1$-$C_8$-alkyl, $C_6$-$C_{10}$-aryl, —$NR^{8A}{}_2$, —$OSiR^{8A}{}_3$ or —$Si(R^{8A})_3$, $R^{9A}$ to $R^{13A}$ are each hydrogen, $C_1$-$C_8$-alkyl, $C_6$-$C_{10}$-aryl, —$NR^{14A}{}_2$, —$OSiR^{14A}{}_3$ or —$Si(R^{14A})_3$ and $R^{8A}$ and $R^{14A}$ are identical or different and are each $C_1$-$C_{10}$-alkyl, 5- to 7-membered cycloalkyl or cycloalkenyl, $C_6$-$C_{40}$-aryl, $C_1$-$C_{10}$-alkoxy or $C_6$-$C_{10}$-aryloxy, where the radicals $R^{8A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system.

The complexes of the formula (Ib) in which the cyclopentadienyl radicals are identical, for example bis(cyclopentadienyl)chromium or bis(indenyl)chromium, are particularly useful.

Further examples of particularly useful complexes of the formula (Ib) are those in which $M^{1A}$ is hafnium, $X^A$ is fluorine, chlorine, $C_1$-$C_4$-alkyl or benzyl, or two radicals $X^A$ form a substituted or unsubstituted diene ligand, t is 2, $R^{1A}$ to $R^{5A}$ are each hydrogen, $C_1$-$C_8$-alkyl or $C_6$-$C_{10}$-aryl, $R^{9A}$ to $R^{13A}$ are each hydrogen, $C_1$-$C_8$-alkyl or $C_6$-$C_{10}$-aryl, $R^{8A}$ and $R^{14A}$ are identical or different and are each $C_1$-$C_{10}$-alkyl, 5- to 7-membered cycloalkyl or cycloalkenyl, $C_6$-$C_{40}$-aryl, $C_1$-$C_{10}$-alkoxy or $C_6$-$C_{10}$-aryloxy, where the radicals $R^{8A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system.

A further preferred group of complexes (Ib) comprises those in which:

$M^{1A}$ is zirconium, $X^A$ is fluorine, chlorine, $C_1$-$C_4$-alkyl or benzyl, or two radicals $X^A$ form a substituted or unsubstituted diene ligand, t is 1 or 2, preferably 2, $R^{1A}$ to $R^{5A}$ are each hydrogen, $C_1$-$C_8$-alkyl, $C_6$-$C_{10}$-aryl, —$OSiR^{8A}{}_3$, $R^{9A}$ to $R^{13A}$ are each hydrogen, $C_1$-$C_8$-alkyl or $C_6$-$C_{10}$-aryl or —$OSiR^{14A}{}_3$ and $R^{8A}$ and $R^{14A}$ are identical or different and are each $C_1$-$C_{10}$-alkyl, 5- to 7-membered cycloalkyl or cycloalkenyl, $C_5$-$C_{15}$-aryl, $C_1$-$C_{10}$-alkoxy or $C_6$-$C_{10}$-aryloxy, where the organic radicals $R^{8A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system.

The preparation of such systems and preferred embodiments are disclosed, for example, in FI-A-960437.

Catalyst components based on the unbridged metallocenes mentioned are particularly suitable for producing the higher molecular weight polymer component. They are also particularly suitable for producing the polymer component having a higher comonomer content. These catalyst components are particularly preferably used for producing a comonomer-rich, higher molecular weight polymer component.

Particularly useful complexes of the formula (Ic) are those in which $R^{15A}$ is

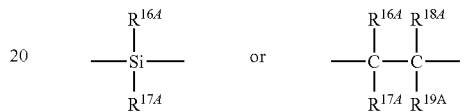

$M^{1A}$ is titanium, zirconium or hafnium, in particular zirconium or hafnium, the radicals $X^A$ are identical or different and are each chlorine, $C_1$-$C_4$-alkyl, benzyl, phenyl or $C_7$-$C_{15}$-alkylaryloxy.

As complexes of the formula (Ic), preference is also given to using bridged bisindenyl complexes in the rac or pseudo-rac form, with the term pseudo-rac referring to complexes in which the two indenyl ligands are in the rac arrangement relative to one another when all other substituents of the complex are disregarded.

The synthesis of such complexes can be carried out by methods known per se, with preference being given to reacting the appropriately substituted, cyclic hydrocarbon anions with halides of titanium, zirconium, hafnium, vanadium, niobium, tantalum or chromium. Examples of appropriate preparative methods are described, inter alia, in Journal of Organometallic Chemistry, 369 (1989), 359-370.

Particularly useful complexes of the general formula (Id) are those in which $M^{1A}$ is titanium or zirconium, in particular titanium, and $X^A$ is chlorine, $C_1$-$C_4$-alkyl or phenyl or two radicals $X^A$ form a substituted or unsubstituted diene ligand, $R^{15A}$ is

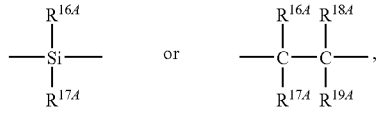

$A^{1A}$ is —O—, —S— or

t is 1 or 2, preferably 2, $R^{1A}$ to $R^{3A}$ and $R^{5A}$ are each hydrogen, $C_1$-$C_{10}$-alkyl, 5- to 7-membered cycloalkyl or cycloalkenyl, $C_6$-$C_{40}$-aryl, —$NR^{8A}{}_2$ or —$Si(R^{8A})_3$, where two radicals $R^{1A}$ to $R^{3A}$ and $R^{5A}$ may also be joined to form a five-, six- or seven-membered ring, with particular preference being given to all $R^{1A}$ to $R^{3A}$ and $R^{5A}$ being methyl.

One group of complexes of the formula (Id) which are particularly useful are those in which $M^{1A}$ is titanium, vanadium or chromium, preferably in the oxidation state III, $X^A$ is chlorine, $C_1$-$C_4$-alkyl or phenyl or two radicals $X^A$ form a substituted or unsubstituted butadiene ligand, $R^{15A}$ is,

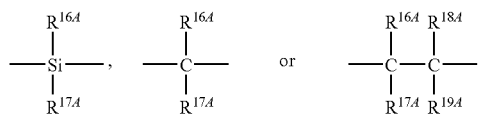

$A^{1A}$ is —$OR^{22A}$, —$NR^{22A}{}_2$, —$PR^{22A}{}_2$ or an unsubstituted, substituted or fused, heterocyclic, in particular heteroaromatic, ring system, v is 1 or when $A^{1A}$ is an unsubstituted, substituted or fused, heterocyclic ring system may be 1 or 0 and $R^{1A}$ to $R^{3A}$ and $R^{5A}$ are each hydrogen, $C_1$-$C_{10}$-alkyl, 5- to 7-membered cycloalkyl or cycloalkenyl, $C_5$-$C_{40}$-aryl or —$Si(R^{8A})_3$, where two radicals $R^{1A}$ to $R^{3A}$ and $R^{5A}$ may also be joined to form a five-, six- or seven-membered ring.

In a preferred embodiment of the complexes (Id), $A^{1A}$ is an unsubstituted, substituted or fused, heteroaromatic ring system and $M^{1A}$ is chromium. Very particular preference is given to $A^{1A}$ being an unsubstituted or substituted, e.g. alkyl-substituted, quinolyl, in particular substituted or unsubstituted quinolyl bound in position 8 or 2, and v being 0 or $A^{1A}$ being a substituted or unsubstituted pyridyl bound in position 2 and v being 1.

In a particularly preferred embodiment of the complexes (Id), at least one of the substituents $R^{1A}$ to $R^{3A}$ and $R^{5A}$ is a $C_6$-$C_{40}$-aryl, $A^{1A}$ is a substituted or unsubstituted quinolyl bound in position 8 or 2 and v is 0 or $A^{1A}$ is a substituted or unsubstituted pyridyl bound in position 2 and v is 1 and $M^{1A}$ is chromium.

The preparation of such functional cyclopentadienyl ligands has been known for a long time. Various synthetic routes to these complexes are described, for example, by M. Enders et al. in Chem. Ber. (1996), 129, 459-463, or P. Jutzi and U. Siemeling in J. Orgmet. Chem. (1995), 500, 175-185.

The metal complexes, in particular the chromium complexes, can be obtained in a simple manner by reacting the corresponding metal salts, e.g. metal chlorides, with the ligand anion (e.g. using a method analogous to the examples in DE-A-19710615).

Further suitable compounds are transition metal complexes which comprise no cyclopentadienyl unit, hereinafter referred to as Cp-free complexes. Suitable Cp-free complexes are complexes of the general formula (II)

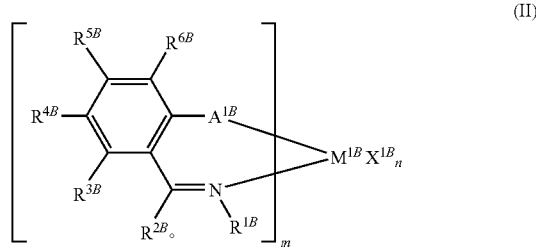

where $M^{1B}$ is titanium, zirconium or hafnium, $R^{1B}$ to $R^{6B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{40}$-aryl, arylalkyl having from 1 to 16 carbon atoms in the alkyl radical and from 6 to 21 carbon atoms in the aryl radical or —$SiR^{9B}{}_3$, where the radicals $R^{1B}$-$R^{6B}$ may also be substituted by halogens and/or two radicals $R^{1B}$-$R^{6B}$, in particular vicinal radicals, may also be joined to form a five-, six- or seven-membered ring, and/or two vicinal radicals $R^{1B}$-$R^{6B}$ may be joined to form a five-, six- or seven-membered heterocycle which comprises at least one atom from the group consisting of N, P, O and S, the radicals $X^{1B}$ are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, arylalkyl having from 1 to 10 carbon atoms in the alkyl radical and from 6 to 20 carbon atoms in the aryl radical, —$OR^{7B}$, —$NR^{7B}R^{9B}$, —O—C(O)—$R^{7B}$ or —O—C(O)—$NR^{7B}R^{8B}$, and the radicals $X^{1B}$ may, if appropriate, be joined to one another, $A^{1B}$ is —O—, —$OR^{7B}$—, —$NR^{7B}$— or $NR^{7B}R^{8B}$—, m is 1 or 2, n is 1, 2 or 3 and is such that, depending on the valence of $M^{1A}$, the metallocene complex of the general formula (II) is uncharged, o is 1 when $NR^{1B}$ together with the adjacent carbon forms an imine or is 2 when $NR^{1B}$ bears a negative charge, where $R^{7B}$ and $R^{8B}$ are each $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, or —$SiR^{9B}$, where the organic radicals $R^{7B}$ and $R^{8B}$ may also be substituted by halogens and/or two radicals $R^{7B}$ and $R^{8B}$ may also be joined to form a five-, six- or seven-membered ring, and the radicals $R^{9B}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, $C_1$-$C_4$-alkoxy or $C_6$-$C_{10}$-aryloxy, where the organic radicals $R^{9B}$ may also be substituted by halogens and/or two radicals $R^{9B}$ may also be joined to form a five-, six- or seven-membered ring.

Preferred transition metal complexes of the general formula (II) are iminophenoxide complexes in which $A^{1B}$ is —O— and o is 1, with the ligands being prepared, for example, from substituted or unsubstituted salicylaldehydes and primary amines, in particular substituted or unsubstituted arylamines. The preparation of such compounds is described, for example, in EP-A 1013674.

Further suitable Cp-free complexes are those of the general formula (III):

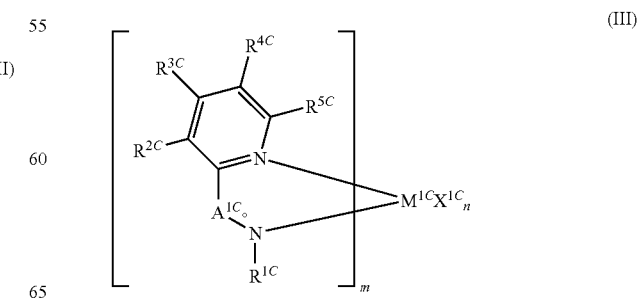

where $M^{1C}$ is titanium, zirconium or hafnium, $R^{1C}$ to $R^{5C}$ are each, independently of one another, hydrogen, $C_1$-$C_{22}$-alkyl, 5- to 7-membered cycloalkyl or cycloalkenyl, $C_2$-$C_{22}$-alkenyl, $C_6$-$C_{40}$-aryl, arylalkyl having from 1 to 16 carbon atoms in the alkyl radical and from 6 to 21 carbon atoms in the aryl radical or —$SiR^{8C}_3$, where the organic radicals $R^{1C}$ to $R^{5C}$ may also be substituted by halogens and/or two radicals $R^{1C}$ to $R^{5C}$, in particular adjacent radicals, may also be joined to form a five-, six- or seven-membered ring, and/or two vicinal radicals $R^{1C}$ to $R^{5C}$ may be joined to form a five-, six- or seven-membered heterocycle which comprises at least one atom from the group consisting of N, P, O and S, the radicals $X^{1C}$ are each, independently of one another, fluorine, chlorine, bromine, iodine, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, —$OR^{6C}$, —$NR^{6C}R^{7C}$, —O—C(O)—$R^{6C}$ or —O—C(O)—$NR^{6C}R^{7C}$, and the radicals $X^{1C}$ may, if appropriate, be joined to one another, $A^{1C}$ is —$CR^{6C}R^{7C}$— or —$CR^{6C}=$, m is 1 or 2, n is 1, 2 or 3 and is such that, depending on the valence of $M^{1A}$, the metallocene complex of the general formula (II) is uncharged, o is 0 or 1, where $R^{6C}$ and $R^{7C}$ are each $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical or —$SiR^{5C}$, where the organic radicals $R^{6C}$ and $R^{7C}$ may also be substituted by halogens and/or two radicals $R^{6C}$ and $R^{7C}$ may also be joined to form a five-, six- or seven-membered ring, and the radicals $R^{8C}$ can be identical or different and can each be $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical, $C_1$-$C_4$-alkoxy or $C_6$-$C_{10}$-aryloxy, where the organic radicals $R^{8C}$ may also be substituted by halogens and/or two radicals $R^{8C}$ may also be joined to form a five-, six- or seven-membered ring.

Preferred transition metal complexes of the general formula (III) are complexes in which o is 1, $A^{1C}$ is —$CR^{6C}R^{7C}$— and $R^{1C}$ is a $C_5$-$C_{40}$-aryl. The preparation of such compounds is described, for example, in WO 02/046249 and WO 03/040201.

Further suitable Cp-free complexes have at least one ligand of the general formulae (IVa) to (IVe),

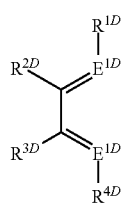

(IVa)

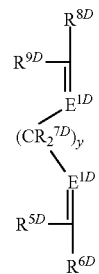

(IVb)

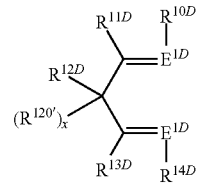

(IVc)

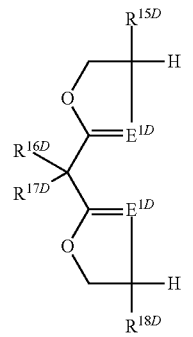

(IVd)

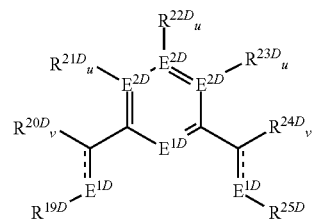

(IVe)

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^{1D}$ is an element of group 15 of the Periodic Table of the Elements, preferably N or P, with particular preference being given to N. The two or three atoms $E^{1D}$ in a molecule may be identical or different. The elements $E^{2D}$ in the formula (IVe) are each, independently of one another, carbon, nitrogen or phosphorus, in particular carbon.

The radicals $R^{1D}$ to $R^{25D}$, which can be identical or different within a ligand system (IVa) to (IVe), are the following groups:

$R^{1D}$ and $R^{4D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{1D}$ and $R^{4D}$ may also be substituted by halogens, with preference being given to hydrocarbon radicals in which the carbon atom adjacent to the element $E^{1D}$ is bound to at least two carbon atoms, $R^{2D}$ and $R^{3D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{2D}$ and $R^{3D}$ may also be substituted by halogens and $R^{2D}$ and $R^{3D}$ may also together form a ring system in which one or more heteroatoms may also be present, $R^{5D}$ to $R^{9D}$ are each, independently of one another, hydrogen, $C_1$-$C_{10}$-alkyl, 5- to 7-membered cycloalkyl or cycloalkenyl, $C_2$-$C_{22}$-alkenyl, $C_5$-$C_{40}$-aryl or arylalkyl having from 1 to 10 carbon atoms in the alkyl radical and from 6 to 20 carbon atoms in the aryl radical, where the organic radicals $R^{5D}$ to $R^{9D}$ may also be substituted by halogens and $R^{6D}$ and $R^{5D}$ or $R^{8D}$ and $R^{9D}$ or two $R^{7D}$ may together form a ring system, $R^{10D}$ and $R^{14D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl having from 1 to 10 carbon atoms in the alkyl radical and from 6 to 20 carbon atoms in the aryl radical, where the organic radicals $R^{10D}$ and $R^{14D}$ may also be substituted by halogens, $R^{11D}$, $R^{12D}$, $R^{12D'}$ and $R^{13D}$ are each, independently of one another, hydrogen, $C_1$-$C_{10}$-alkyl, 5- to 7-membered cycloalkyl or cycloalkenyl, $C_2$-$C_{22}$-alkenyl, $C_5$-$C_{40}$-aryl or arylalkyl having from 1 to 10 carbon atoms in the alkyl radical and from 6 to 20 carbon atoms in the aryl radical, where the organic radicals $R^{11D}$, $R^{12D}$, $R^{12D'}$ and $R^{13D}$ may also be substituted by halogens and two or more geminal or vicinal radicals $R^{11D}$, $R^{12D}$, $R^{12D'}$ and $R^{13D}$ may together form a ring system, $R^{15D}$ to $R^{18D}$ and $R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and from 6 to 20 carbon atoms in the aryl radical or —$SiR^{26D}_3$, where the organic radicals $R^{15D}$-$R^{18D}$ and $R^{20D}$-$R^{24D}$ may also be substituted by halogens and two vicinal radicals $R^{15D}$-$R^{18D}$ and $R^{20D}$-$R^{24D}$ may also be joined to form a five- or six-membered ring, $R^{19D}$ and $R^{25D}$ are each, independently of one another, $C_6$-$C_{40}$-aryl, arylalkyl having from 1 to 10 carbon atoms in the alkyl radical and 6-20 carbon atoms in the aryl radical or —$NR^{26D}_2$, where the organic radicals $R^{19D}$ and $R^{26D}$ may also be substituted by halogens or a group comprising Si, N, P, O or S, $R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, $NR^{26D}_2$, —$SiR^{26D}_3$, where the organic radicals $R^{20D}$ to $R^{25D}$ may also be substituted by halogens and/or two geminal or vicinal radicals $R^{20D}$ to $R^{25D}$ may also be joined to form a five-, six- or seven-membered ring, and/or two geminal or vicinal radicals $R^{20D}$ to $R^{26D}$ are joined to form a five-, six- or seven-membered heterocycle which comprises at least one atom from the group consisting of N, P, O and S, the radicals $R^{26D}$ are each, independently of one another, hydrogen, $C_1$-$C_{20}$-alkyl, 5- to 7-membered cycloalkyl or cycloalkenyl, $C_2$-$C_{20}$-alkenyl, $C_6$-$C_{40}$-aryl or arylalkyl having from 1 to 10 carbon atoms in the alkyl radical and 6-20 carbon atoms in the aryl radical and two radicals $R^{26D}$ may also be joined to form a five- or six-membered ring, u is 0 when $E^{2D}$ is nitrogen or phosphorus and is 1 when $E^{2D}$ is carbon, the indices v are each, independently of one another, 1 or 2, with the bond between the carbon which then bears one radical and the adjacent element $E^{1D}$ being a double bond when v is 1 and the bond between the carbon which then bears two radicals and the adjacent element $E^{1D}$ being a single bond when v is 2, x is 0 or 1, with the complex of the formula (IVc) being negatively charged when x is 0, and y is an integer from 1 to 4, preferably 2 or 3.

Cp-free complexes having Fe, Co, Ni, Pd or Pt as central metal and ligands of the formula (IVa) are particularly useful.

Catalyst components based on the late transition metal complexes mentioned are particularly suitable for producing the lower molecular weight polymer component. They are also particularly suitable for producing the polymer component which has a relatively low comonomer content, in particular the polymer component which is essentially comonomer-free. These catalyst components are particularly preferably used for producing a low-comonomer, low molecular weight polymer component.

Preferred transition metal complexes for preparing the hybrid catalyst systems used in the method of the invention are complexes of the ligands (lye) with transition metals Fe, Co or Ni and in particular those of the general formula (V)

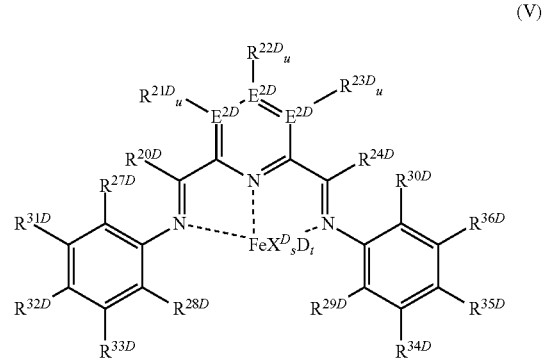

(V)

where
the atoms $E^{2D}$ are each, independently of one another, carbon, nitrogen or phosphorus, in particular carbon, $R^{20D}$ and $R^{24D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, —$NR^{26D}_2$ or —$SiR^{26D}_3$, where the organic radicals $R^{20D}$ and $R^{24D}$ may also be substituted by halogens, $R^{21D}$ to $R^{23D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, —$NR^{26D}_2$ or —$SiR^{26D}_3$, where the organic radicals $R^{21D}$ to $R^{23D}$ may also be substituted by halogens and/or two vicinal radicals $R^{21D}$ to $R^{23D}$ may also be joined to form a five-, six- or seven-membered ring, and/or two vicinal radicals $R^{21D}$ to $R^{23D}$ are joined to form a five-, six- or seven-membered heterocycle which comprises at least one atom from the group consisting of N, P, O and S, u is 0 when $E^{2D}$ is nitrogen or phosphorus and is 1 when $E^{2D}$ is carbon, $R^{27D}$ to $R^{30D}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{26D}{}_2$, $-OR^{26D}$ or $SiR^{26D}{}_3$, where the organic radicals $R^{27D}$ to $R^{30D}$ may also be substituted by halogens and/or two vicinal radicals $R^{27D}$ to $R^{30D}$ may also be joined to form a five-, six- or seven-membered ring, and/or two vicinal radicals $R^{27D}$ to $R^{30D}$ are joined to form a five-, six- or seven-membered heterocycle which comprises at least one atom from the group consisting of N, P, O and S, $R^{31D}$ to $R^{36D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl having from 1 to 10 carbon atoms in the alkyl radical and 6-20 carbon atoms in the aryl radical, halogen, $-NR^{26D}{}_2$, $-OR^{26D}$ or $-SiR^{26D}{}_3$, where the organic radicals $R^{31D}$ to $R^{36D}$ may also be substituted by halogens and/or two vicinal radicals $R^{31D}$ to $R^{36D}$ may also be joined to form a five-, six- or seven-membered ring, and/or two vicinal radicals $R^{31D}$ to $R^{36D}$ are joined to form a five-, six- or seven-membered heterocycle which comprises at least one atom from the group consisting of N, P, O and S, the indices v are each, independently of one another, 0 or 1, the radicals $X^D$ are each, independently of one another, fluorine, chlorine, bromine, iodine, hydrogen, $C_1$-$C_{10}$-alkyl, $C_2$-$C_{10}$-alkenyl, $C_6$-$C_{40}$-aryl, arylalkyl having 1-10 carbon atoms in the alkyl radical and 6-20 carbon atoms in the aryl radical, $-NR^{26D}{}_2$, $-OR^{26D}$, $-SR^{26D}$, $-SO_3R^{26D}$, $-O-C(O)-R^{26D}$), $-CN$, $SCN$, β-diketonate, $CO$, $BF_4^-$, $PF_6^-$ or bulky noncoordinating anions and the radicals $X^D$ may, if appropriate, be joined to one another, the radicals $R^{26D}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{26D}$ may also be substituted by halogens or nitrogen- and oxygen-comprising groups and two radicals $R^{26D}$ may also be joined to form a five- or six-membered ring, s is 1, 2, 3 or 4, in particular 2 or 3, D is an uncharged donor and t is from 0 to 4, in particular 0, 1 or 2.

Furthermore, preference is also given to transition metal complexes having bidentate or tridentate chelating ligands having ether, amine or amide functionality. In such ligands, an ether function is, for example, bound to an amine or amide function.

Suitable Cp-free complexes also include imido-chromium compounds in which chromium bears at least one imido group as structural feature. These compounds and their preparation are described, for example, in WO 01/09148.

Further suitable Cp-free complexes are complexes having a tridentate macrocyclic ligand, in particular a substituted or unsubstituted 1,3,5-triazacyclohexane or 1,4,7-triazacyclononane. In the case of this type of complex, too, preference is likewise given to the chromium complexes.

Catalysts based on chromium, e.g. Phillips catalysts, or Ziegler-Natta catalysts are also suitable as transition metal components from which the hybrid catalysts used in the inventive method of polymerizing olefins can be obtained.

Ziegler catalysts generally comprise a titanium- or vanadium-comprising solid component which is prepared using titanium or vanadium compounds and also inorganic or polymeric finely divided supports, compounds of magnesium, halogen compounds and electron donor compounds. For the purposes of the present invention, the term Ziegler catalysts encompasses those referred to in the literature as Ziegler-Natta catalysts.

Phillips catalysts are usually prepared by applying a chromium compound to an inorganic support and subsequently calcining this at temperatures in the range from 350 to 950° C., resulting in chromium present in valences lower than six being converted into the hexavalent state. Apart from chromium, further elements such as Mg, Ca, B, Al, P, Ti, V, Zr and Zn can also be used. Particular preference is given to the use of Ti, Zr or Zn. It may be emphasized that combinations of the abovementioned elements are also possible according to the invention. The catalyst precursor can also be doped with fluoride prior to or during calcination. As supports for Phillips catalysts, which are also known to those skilled in the art, mention may be made of aluminum oxide, silicon dioxide (silica gel), titanium dioxide, zirconium dioxide or their mixed oxides or cogels, or aluminum phosphate. Further suitable support materials can be obtained by modifying the pore surface area, e.g. by means of compounds of the elements boron, aluminum, silicon or phosphorus. Preference is given to using a silica gel. Preference is given to spherical or granular silica gels, with the former also being able to be spray dried. The activated chromium catalysts can subsequently be prepolymerized or prereduced. The prereduction is usually carried out by means of Co or else by means of hydrogen at 250-500° C., preferably at 300-400° C., in an activator.

Some of the transition metal complexes mentioned have little polymerization activity on their own and are therefore brought into contact with an activating compound in order to be able to display good polymerization activity. For this reason, the hybrid catalyst preferably comprises one or more activating compounds, hereinafter also referred to as activators or cocatalysts, as further component. Depending on the type of catalyst components, one or more activators may be advantageous. For example, it is possible for activation to be carried out using the same activator or activator mixture or different cocatalysts. It is advantageous for the same activator to be used for at least two catalyst components, particularly advantageously for all catalyst components.

Suitable activators are, for example, compounds such as an aluminoxane, a strong uncharged Lewis acid, an ionic compound having a Lewis-acid cation or an ionic compound having a Brönsted acid as cation. Suitable activators for the types of catalyst mentioned are generally known.

The amount of activating compounds to be used depends on the type of activator. In general, the molar ratio of metal complex (A) to activating compound (C) can be from 1:0.1 to 1:10 000, preferably from 1:1 to 1:2000.

To carry out the method of the invention, preference is given to using at least one aluminoxane as activating compound. As aluminoxanes, it is possible to use, for example, the compounds described in WO 00/31090. A particularly useful aluminoxane is methylaluminoxane (MAO).

As strong, uncharged Lewis acids, preference is given to compounds of the general formula (VI)

where $M^{2D}$ is an element of group 13 of the Periodic Table of the Elements, in particular B, Al or Ga, preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl. Examples of strong, uncharged Lewis acids are given in WO 00/31090.

Suitable ionic compounds having Lewis-acid cations are salt-like compounds of the cation of the general formula (XIII)

$$[((M^{3D})^{a+})Q_1Q_2\ldots Q_z]^{d+} \qquad (XIII)$$

where $M^{3D}$ is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

It is also possible to use mixtures of all the abovementioned activators. Preferred mixtures comprise aluminoxanes, in particular methylaluminoxane, and an ionic compound, in particular one comprising the tetrakis(pentafluorophenyl)borate anion, and/or a strong uncharged Lewis acid, in particular tris(pentafluorophenyl)borane or a boroxin.

As joint activator for the preferred hybrid catalysts mentioned, preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-di-methylbenzylammonium tetrakis (pentafluorophenyl)borate or trityl tetrakispentafluorophenylborate as activator for hafnocenes, in particular in combination with an aluminoxane as activator for the iron complex. The reaction products of aluminum compounds of the formula (XIII) with perfluorinated alcohols and phenols are also particularly useful as joint activator.

The hybrid catalysts can be used in supported or unsupported form, with the supported form being preferred, particularly when used in gas-phase polymerization reactors.

As support, preference is given to using finely divided supports which can be any organic or inorganic solids. As inorganic support materials, preference is given to silica gel, magnesium chloride, aluminum oxide, mesoporous materials, aluminosilicates and hydrotalcites. Particular preference is given to using silica gel, since particles whose size and structure make them suitable as supports for olefin polymerization can be produced from this material. Spray-dried silica gels which comprise spherical agglomerates of smaller granular particles, i.e. primary particles, have been found to be particularly useful.

The supports used preferably have a specific surface area in the range from 10 to 1000 m²/g, a pore volume in the range from 0.1 to 5 ml/g and a mean particle diameter of from 1 to 500 μm. Preference is given to supports having a specific surface area in the range from 50 to 700 m²/g, a pore volume in the range from 0.4 to 3.5 ml/g and a mean particle diameter in the range from 5 to 350 μm. Particular preference is given to supports having a specific surface area in the range from 200 to 550 m²/g, a pore volume in the range from 0.5 to 3.0 ml/g and a mean particle diameter of from 10 to 150 μm, in particular 30-120 μm.

The supports can be subjected to a thermal treatment, e.g. to remove adsorbed water, before use. Such a drying treatment is generally carried out at temperatures in the range from 80 to 300° C., preferably from 100 to 200° C., with drying at from 100 to 200° C. preferably being carried out under reduced pressure and/or under a blanket of inert gas (e.g. nitrogen). As an alternative, inorganic supports are calcined at temperatures of between 200 to 1000° C., to produce, if appropriate, the desired structure of the solid and/or set the desired OH concentration of the surface.

In particular, combinations of the preferred embodiments of the activators with the preferred embodiments of the catalyst components are preferred.

In a preferred method of preparing a supported hybrid catalyst, at least one iron complex is brought into contact with an activator and subsequently mixed with the dehydrated or passivated support. The further transition metal compound, preferably a hafnocene or zirconocene, is likewise brought into contact with at least one activator in a suitable solvent, preferably giving a soluble reaction product, an adduct or a mixture. The preparation obtained in this way is then mixed with the immobilized iron complex, which is used directly or after separation of the solvent, and the solvent is completely or partly removed. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243, WO 98/40419 or WO 00/05277. In a further preferred embodiment, the activator is firstly applied to the support and this supported compound is subsequently brought into contact with the appropriate transition metal compounds.

The hybrid catalyst can further comprise, as additional component, a metal compound of the general formula (XX), $$M^G(R^{1G})_rG(R^{2G})_sG(R^{3G})_tG \qquad (XX)$$

where $M^G$ is Li, Na, K, Be, Mg, Ca, Sr, Ba, boron, aluminum, gallium, indium, thallium, zinc, in particular Li, Na, K, Mg, boron, aluminum or Zn, $R^{1G}$ is hydrogen, $C_1$-$C_{10}$-alkyl, $C_6$-$C_{15}$-aryl, alkylaryl or arylalkyl each having from 1 to 10 carbon atoms in the alkyl radical and from 6 to 20 carbon atoms in the aryl radical, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl radical and from 6 to 20 carbon atoms in the aryl radical, or alkoxy comprising $C_1$-$C_{10}$-alkyl or $C_8$-$C_{15}$-aryl, $r^G$ is an integer from 1 to 3 and $s^G$ and $t^G$ are integers from 0 to 2, with the sum $r^G+s^G+t^G$ corresponding to the valence of $M^G$, where the component (E) is usually not identical to the component (C). It is also possible to use mixtures of various metal compounds of the formula (XX).

Among the metal compounds of the general formula (XX), preference is given to those in which $M^G$ is lithium, magnesium, boron or aluminum and $R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

Preference is given to at least two of the abovementioned transition metal coordination compounds and in particular all of the transition metal coordination compounds employed as constituents of the hybrid catalysts used according to the invention being chemically different. Even though the use of only two transition metal coordination compounds in the hybrid catalyst is particularly preferred, the use of further transition metal coordination compounds is not ruled out.

Preferred combinations of transition metal complexes are those in which at least one Cp-free complex, in particular a complex of the formula (V), is used. Preference is also given to combinations comprising at least one complex of the formula I, in particular a complex of the formula I and a Cp-free complex of the formula V, a complex of the formula I and a Cp-free complex of the formula II, a complex of the formula I and a Cp-free complex of the formula III or two different complexes of the formula Ib.

Particularly preferred catalyst components are those based on transition metal coordination compounds of the formula Ib and/or Id. Particular preference is also given to those based on transition metal coordination compounds of the formula V. The method is particularly well-suited to combinations comprising a Cp-comprising complex of the formula Ib and/or Id and a Cp-free complex of the formula V.

Hybrid catalysts which are particularly preferred for the method of the invention comprise
A) at least one transition metal complex based on a monocyclopentadienyl complex of a metal of groups 4-6 of the Periodic Table of the Elements whose cyclopentadienyl system is substituted by an uncharged donor (A1) or based on a hafnocene (A2),
B) at least one organic transition metal compound (B) of iron or cobalt with a tridentate ligand bearing at least two ortho, ortho-disubstituted aryl radicals,
C) optionally one or more activators,
D) optionally one or more organic or inorganic supports,
E) optionally one or more metal compounds comprising a metal of group 1, 2 or 13 of the Periodic Table.

The molar ratio of organic transition metal compound A to organic transition metal compound B is usually in the range from 1:100 to 100:1, preferably from 1:10 to 10:1 and particularly preferably from 1:5 to 5:1. Organic transition metal compound A preferably produces, when it is used alone in a catalyst under the same reaction conditions in the homopolymerization or copolymerization of ethylene, a higher $M_n$ than does organic transition metal compound B when it is used alone in a catalyst under the same reaction conditions. The preferred embodiments of the catalyst components A1, A2 and B are preferred both in the combination of organic transition metal compound A1 with B and in the combination of organic transition metal compound A2 with B.

The inventive methods are suitable for the polymerization of olefins and especially for the polymerization of α-olefins, i.e. hydrocarbons having terminal double bonds.

Suitable monomers can be functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins. Suitable olefins also include ones in which the double bond is part of a cyclic structure which can comprise one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins.

In particular, the method of the invention can be used for the polymerization or copolymerization of ethylene or propylene. As comonomers in the polymerization of ethylene, preference is given to using $C_3$-$C_8$-α-olefins, in particular 1-butene, 1-pentene, 1-hexene and/or 1-octene. Preferred comonomers in the polymerization of propylene are ethylene and/or butene. Particular preference is given to a process in which ethylene is copolymerized with 1-hexene or 1-butene.

The inventive method of polymerizing olefins can be carried out at temperatures in the range from 0 to 200° C., preferably from 25 to 150° C. and particularly preferably from 40 to 130° C., and under pressures of from 0.05 to 10 MPa, particularly preferably from 0.3 to 4 MPa, using all industrially known polymerization processes. The polymerization can be carried out batchwise or preferably continuously in one or more stages. Solution processes, suspension processes, stirred gas-phase processes or gas-phase fluidized processes are all possible. Processes of this type are generally known to those skilled in the art.

The supported or unsupported hybrid catalysts can be subjected to a prepolymerization before use, with prepolymerization of the supported catalyst system being preferred. The prepolymerization can be carried out in the gas phase, in suspension or in the monomer (bulk), and can be carried out continuously in a prepolymerization unit installed upstream of the polymerization reactor or in a discontinuous prepolymerization unit independent of the reactor operation.

In the case of suspension polymerizations, the polymerization is usually carried out in a suspension medium, preferably in an inert hydrocarbon such as isobutane or mixtures of hydrocarbons or else in the monomers themselves. The suspension polymerization temperatures are usually in the range from −20 to 115° C., and the pressure is in the range from 0.1 to 10 MPa. The solids content of the suspension is generally in the range from 10 to 80%. The polymerization can be carried out either batchwise, e.g. in stirring autoclaves, or continuously, e.g. in tube reactors, preferably in loop reactors. In particular, it can be carried out by the Phillips-PF process as described in U.S. Pat. No. 3,242,150 and U.S. Pat. No. 3,248,179.

Among the polymerization processes mentioned, gas-phase polymerization, in particular in gas-phase fluidized-bed reactors, solution polymerization and suspension polymerization, in particular in loop reactors and stirred tank reactors, are preferred.

Particular preference is given to gas-phase polymerization in a gas-phase fluidized-bed reactor in which the circulated reactor gas is fed in at the lower end of a reactor and is taken off again at its upper end. In the polymerization of α-olefins, the circulated reactor gas is usually a mixture of the α-olefin to be polymerized, if desired a molecular weight regulator such as hydrogen and inert gases such as nitrogen and/or lower alkanes such as ethane, propane, butane, pentane or hexane. Preference is given to using propane, if appropriate in combination with further lower alkanes. The velocity of the reactor gas has to be sufficiently high to fluidize the mixed bed of finely divided polymer which is located in the tube and serves as polymerization zone and also to remove the heat of polymerization effectively (noncondensed mode). The polymerization can also be carried out in the condensed or supercondensed mode, in which part of the circulating gas is cooled to below the dew point and is recirculated as a two-phase mixture to the reactor in order to make additional use of the enthalpy of vaporization for cooling the reaction gas.

In gas-phase fluidized-bed reactors, it is advisable to work at pressures of from 0.1 to 10 MPa, preferably from 0.5 to 8 MPa and in particular from 1.0 to 3 MPa. In addition, the cooling capacity required depends on the temperature at which the (co)polymerization is carried out in the fluidized bed. For the method of the invention, it is advantageous to work at temperatures of from 30 to 160° C., particularly preferably from 65 to 125° C., with temperatures in the upper part of this range preferably being set for copolymers of relatively high density and temperatures in the lower part of this range preferably being set for copolymers of relatively low density.

It is also possible to use a multizone reactor in which two polymerization zones are connected to one another and the polymer is passed alternately a number of times through these two zones, with the two zones also being able to have different polymerization conditions. Such a reactor is described, for example, in WO 97/04015 and WO 00/02929.

The different or else identical polymerization processes can, if desired, also be connected in series so as to form a polymerization cascade. A parallel reactor arrangement using two or more identical or different processes is also possible. However, the polymerization is preferably carried out in only a single reactor.

The method of the invention makes it possible to prepare polymer molding compositions having particularly advantageous properties. The molding compositions preferably have a polydispersity $M_w/M_n$ of above 4, more preferably from 5 to 50, particularly preferably from 7 to 35. The melt flow rate, measured at 190° C. under a load of 21.6 kg, is preferably from 1 to 300 g/10 min. If catalysts having different monomer incorporation capabilities are used, the comonomer content of the polymer product and thus also the density in the case of the polymerization of ethylene can be altered via the proportion of the respective polymer component.

An important application of bimodal or multimodal polyolefins, in particular polyethylenes, is the production of pressure pipes for the transport of gas, mains water and wastewater. Pressure pipes made of polyethylene are increasingly replacing metal pipes. A very long operating life of the pipe, without aging and brittle failure having to be feared, is important for such an application. Even small flaws or notches in a pressure pipe can grow even at low pressures and lead to brittle failure, and this process can be accelerated by higher temperatures and/or aggressive chemicals. It is therefore extremely important to reduce the number and size of flaws in a pipe, e.g. specks or "white spots" to the greatest possible extent.

Films having a low level of specks and a very high mechanical strength, and excellent processability, can also be obtained. The modifiers used according to the invention have the additional property that they do not influence the organoleptics of the products and are therefore also particularly suitable for medical and food applications.

The preparation of the products in the reactor reduces the energy consumption, requires no subsequent blending processes and makes simple control of the molecular weight distributions and the different molecular weights of the polymer components possible. In addition, good mixing of the polymer is achieved.

The mode of action of the modifiers used according to the invention will hereinafter be illustrated with the aid of the FIGURE, without the invention being restricted thereto.

FIG. 1 schematically shows a typical molar mass distribution of a polymer prepared using a hybrid catalyst. The curved maximum is due to the higher molecular weight polymer component, while the left-hand shoulder is due to the lower molecular weight polymer component. The present distribution was produced by means of a hybrid catalyst comprising an iron-bisimine complex of the formula (V) and a hafnocene as catalyst components.

The continuous line shows the distribution without addition of modifiers. The addition of water selectively reduces the activity of the iron-bisimine catalyst so that the left-hand shoulder decreases while the maximum increases, since the amount of the lower molecular weight component is reduced compared to the higher molecular weight polymer component. The broken-lined curve shows the distribution after addition of water. The molar masses and molar mass distributions of the polymer components change only insignificantly, as can be seen from the unchanged position of the curve.

The parameters used in the present patent application were determined in the following way:

Limiting Viscosity [dl/g]
  The determination of the limiting viscosity η, which is the limiting value of the viscosity number on extrapolation of the polymer concentration to zero, was carried out on an automatic Ubbelohde viscometer (Lauda PVS 1) using decalin as solvent at 135° C. in accordance with ISO 1628.

Width of the Molar Mass Distribution:
  Gel permeation chromatography (GPC) was carried out at 140° C. in 1,2,4-trichlorobenzene using a Waters 150C GPC apparatus. The evaluation of the data was carried out using the software Win-GPC from HS-Entwicklungsgesellschaft for wissenschaftliche Hard- and Software mbH, Ober-Hilbersheim. The columns were calibrated by means of polyethylene standards having molar masses of from 100 to $10^7$ g/mol. Mass average molar masses ($M_w$) and number average molar masses ($M_n$) of the polymers and the ratio of mass average to number average ($M_w/M_n$) were determined.

Density and Comonomer Content:
  The density and the comonomer content were determined by means of IR spectroscopy. The IR spectra were measured on films having a thickness of 0.1 mm produced by pressing at 180° C. for 15 minutes. The correlation of the IR spectra with the density of the polymer samples was obtained by means of chemical calibration against polymer standards whose density had been determined by measuring the density by the buoyancy method in accordance with ISO 1183. The correlation of the IR spectra with the comonomer content of the polymer samples was obtained by means of chemical calibration against polymer standards whose hexene content had been determined by evaluation of NMR spectra. To measure the NMR spectra, the polymer standards were placed in the tubes under inert gas and the tubes were flame sealed. The solvent signals, whose chemical shift had been converted to a chemical shift relative to TMS, served as internal standard in the $^1$H- and $^{13}$C-NMR spectra.

The branches/1000 carbon atoms were determined by means of $^{13}$C-NMR, as described by James C. Randall, JMS-REV. Macromol. Chem. Phys., C29 (2&3), 201-317 (1989), and are based on the total CH$_3$ group content/1000 carbon atoms.

Melting Point:

The melting point T$_m$ was determined by DSC measurement in accordance with ISO 3146 with a first heating at a heating rate of 20° C. per minute to a temperature of 200° C., a dynamic crystallization at a cooling rate of 20° C. per minute down to a temperature of 25° C. and a second heating at a heating rate of 20° C. per minute back to a temperature of 200° C. The melting point is then the temperature at which the curve of the enthalpy against the temperature measured on the second heating displays a maximum.

The contents of the abovementioned documents are hereby incorporated by reference into the present patent application. Unless indicated otherwise, amounts and ratios are always based on the masses.

EXAMPLES

All syntheses and polymerizations were carried out under an argon atmosphere.

Example 1

Preparation of 2,6-bis[1-(2-chloro,6-methyl-phenylimino)ethyl]pyridineiron(II) chloride

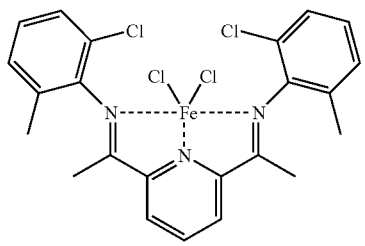

2,6-Bis[1-(2-chloro,6-methyl-phenylimino)ethyl]pyridine was prepared as described in example 2 of WO 98/27124 and was reacted in accordance with the method in example 8 of WO 98/27124 with iron(II) chloride to give 2,6-bis[1-(2-chloro,6-methyl phenylimino)ethyl]pyridineiron(II) chloride.

Example 2

Preparation of a Supported Hybrid Catalyst

Sylopol 2107 (spray-dried silica gel from Grace, Worms) was baked at 600° C. in a stream of nitrogen for 6 hours.

A mixture of 632 mg (1.042 mmol) of the 2,6-bis[1-(2-chloro,6-methyl-phenylimino)-ethyl]pyridineiron(II) chloride, 4.38 g (8.903 mmol) of bis(n-butylcyclopentadienyl)hafnium dichloride (from Crompton) and 188 ml of MAO (methylaluminoxane; 4.75 M in toluene from Crompton; 895 mmol) were stirred at room temperature for 30 minutes, subsequently added while stirring to 147.9 g of the pretreated silica gel and the mixture was stirred at room temperature for another 2 hours. The molar ratio (Fe+Hf):Al was 1:90. The solid obtained was dried under reduced pressure until it was free-flowing. This gave 310.4 g of catalyst solid which still comprised 34% by weight of solvent.

Examples 3-5

Polymerization in a 1 l Steel Autoclave

Example 3

70 g of coarse polyethylene powder having a particle size of >1 mm (sieve fraction; baked at 80° C. under reduced pressure for 6 hours and stored under argon) were placed in an argon-filled 1 l steel autoclave. 150 mg of isoprenylaluminum (IPRA; 100 mg/ml of IPRA in heptane; from Crompton) and 14 ml of heptane were added. After stirring for 5 minutes, 150 mg of the catalyst solid prepared in example 2 were added and the catalyst reservoir and the lines were rinsed with 2 ml of heptane. The autoclave was subsequently heated to 70° C., argon was introduced until a pressure of 10 bar had been reached and ethylene was then fed in until a pressure of 20 bar had been reached. The monomer fed in was subsequently changed to a mixture of ethylene and gaseous 1-hexene, with the 1-hexene content of this mixture being 20% by volume. The internal pressure in the reactor was maintained at 20 bar for 1 hour by metering in ethylene and 1-hexene. The stirrer was then switched off, the introduction of ethylene was stopped, the reactor was depressurized and cooled to room temperature. The polymer was taken from the reactor, dried under reduced pressure and separated from the initial charge by sieving. 63 g of polyethylene were obtained.

The further results of the polymerization are shown in table 1 below.

Example 4

The procedure of example 3 was repeated, but 20 mg of water with heptane were additionally introduced into the reactor with the aid of a microsyringe after the addition of the catalyst solid and rinsing of the lines. 49 g of polyethylene were obtained.

The further results of the polymerization are shown in table 1 below.

Example 5

The procedure of example 3 was repeated, but 22 mg of CO$_2$ were additionally introduced into the reactor after the pressure had been increased to 10 bar by means of argon and before ethylene was introduced. For this purpose, a lock was filled with the appropriate amount of gaseous CO$_2$ and the CO$_2$ was flushed into the autoclave by means of ethylene. 36 g of polyethylene were obtained.

The further results of the polymerization are shown in table 1 below.

TABLE 1

| Ex. | Modifier | Modifier [mg] | Productivity [g of PE/g of cat.] | η [dl/g] | Density [kg/m$^3$] | Hexene [% by wt.] | M$_w$/10$^3$ [g/mol] | M$_w$/M$_n$ |
|---|---|---|---|---|---|---|---|---|
| 3 | None | 0 | 420 | 2.58 | 951.3 | 4.9 | 139 | 15.2 |
| 4 | Water | 20 | 319 | 3.19 | 922.5 | 8.8 | 284.4 | 18.8 |
| 5 | CO$_2$ | 22 | 230 | 0.917 | 961.0 | 1 | 47.3 | 6.6 |

Comparison of examples 4 and 3 shows that water leads to a significant increase in the viscosity and $M_w$, i.e. selectively decreases the proportion of the lower molecular weight component. The very low incorporation of comonomer into the low molecular weight component made possible by the iron catalyst simultaneously leads to a drastic decrease in the density, since the density correlates with the comonomer content.

The addition of carbon dioxide, on the other hand, has the opposite effect. The viscosity and the $M_w$ are drastically reduced, while the density is increased greatly, since the activity of the higher molecular weight component is selectively reduced.

Although in both cases the amount of modifier used very strongly deactivates the catalyst component which is sensitive to the respective modifier, there is relatively little effect on the total productivity. This emphasizes the high selectivity of the modifiers used according to the invention, since significantly lower concentrations are normally employed.

Examples 6 and 7

Continuous Gas-Phase Polymerization

In a continuously operated gas-phase fluidized-bed reactor, ethylene-hexene copolymers were prepared at a gas composition of 50% by volume of ethylene, 0.3% by volume of hexene and 5% by volume of hexane at a reactor pressure of 20 bar and a reactor temperature of 100° C. using the catalyst solid prepared in example 2. Nitrogen was used as inert gas (44% by volume). Furthermore, 0.1 g/h of triisobutylaluminum and 6 ppm, based on the amount of polymer discharged (output), of Costelan AS 100 (H. Costenoble GmbH & Co. KG, Eschborn) as a solution in hexane were metered in. The metering rate for the catalyst solid was 4.0 g/h in example 6 and 2.9 g/h in example 7. In example 7, 10 mol ppm of water, based on the output, were additionally introduced in gaseous form, with the addition being effected by introduction of moist nitrogen having a water content of 100 ppm.

The results of examples 6 and 7 are shown in table 2.

TABLE 2

| Ex. | $H_2O$ [ppm] | Output [kg/h] | Productivity [g of PE/g of cat.] | η [dl/g] | Density [kg/m³] | $MFR_{21}$ [g/10'] | Bulk Density [kg/m³] | $M_w/10^3$ [g/mol] | $M_w/M_n$ |
|---|---|---|---|---|---|---|---|---|---|
| 6 | 0 | 5 | 1360 | 2.18 | 944.9 | 29.5 | 420 | 144.4 | 10.1 |
| 7 | 10 | 4 | 1220 | 2.42 | 943.6 | 17.0 | 390 | 167.7 | 10.8 |

Comparison of examples 6 and 7 shows that the relative amount of the lower molecular weight comonomer-free polymer component as a proportion of the total polymer decreases as a result of addition of water, which is shown in the total polymer properties by a higher $M_w$ and higher intrinsic viscosity and also lower MFR and density. Furthermore, it can be seen from table 2 that the method makes fine regulation of the proportions in the percent range possible. It is therefore not only demonstrated that this method is, as can be seen from examples 4 and 5, suitable for selectively effecting a large change in the proportions by mass of the components of the polymer but also that it allows fine regulation of the ratios of the components in a continuous process. A product having prescribed properties can be produced and regulated within very narrow limits by means of the method of the invention when using hybrid catalysts.

The invention claimed is:

1. A method of preparing olefin polymers comprising polymerizing at least one α-olefin in the presence of a catalyst system comprising a catalyst component comprising iron or cobalt, and a catalyst component comprising a cyclopentadienyl ligand to produce a polymer comprising at least a higher molecular weight polymer component and a lower molecular weight polymer component; the method comprising carrying out said polymerizing in the presence of water wherein the ratio of the higher molecular weight component to the lower molecular weight component is increased.

2. A method of preparing olefin polymers comprising polymerizing at least one α-olefin in the presence of a catalyst system to produce a polymer comprising at least a higher molecular weight polymer component and a lower molecular weight polymer component; the method comprising carrying out said polymerizing in the presence of water in an amount of from 2 to 100 mol ppm based on a total reaction mixture, wherein the ratio of the higher molecular weight component to the lower molecular weight component and the catalyst system comprising at least two different catalyst components, wherein at least one catalyst component comprises a Cp-free transition metal complex of a metal selected from Ti, Zr, Hf, Sc, V, Nb, Ta, Cr, Mo, W, Fe, Co, Ni, Pd, Pt or the elements of the rare earth metals, and at least one ligand of formulae (IVa) to (IVe):

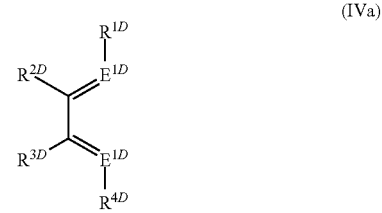

(IVa)

-continued

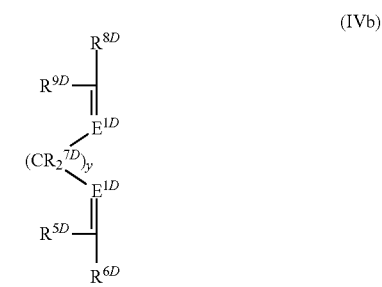

(IVb)

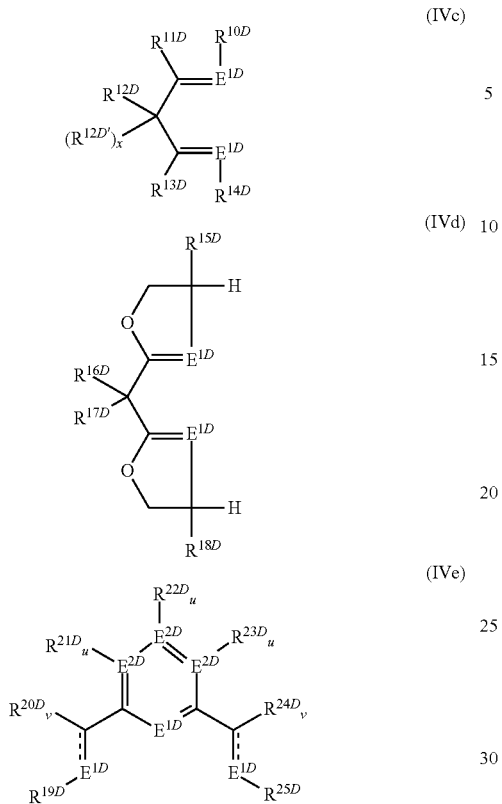

wherein
- the atoms $E^{1D}$ are each, independently of one another, an element of group 15 of the Periodic Table of the Elements;
- the atoms $E^{2D}$ are each, independently of one another, carbon, nitrogen or phosphorus;
- $R^{1D}$ and $R^{4D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical; wherein $R^{1D}$ and $R^{4D}$ are optionally substituted by at least one halogen;
- $R^{2D}$ and $R^{3D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{2D}$ and $R^{3D}$ are optionally substituted by at least one halogen, and $R^{2D}$ and $R^{3D}$ optionally together form a ring system comprising at least one heteroatom;
- $R^{5D}$ to $R^{9D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{5D}$ to $R^{9D}$ are optionally substituted by at least one halogen, and $R^{6D}$ and $R^{5D}$ or $R^{8D}$ and $R^{9D}$ or two $R^{7D}$ optionally together form a ring system;
- $R^{10D}$ and $R^{14D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{10D}$ and $R^{14D}$ are optionally substituted by at least one halogen;
- $R^{11D}$, $R^{12D}$, $R^{12D'}$ and $R^{13D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{11D}$, $R^{12D}$, $R^{12D'}$ and $R^{13D}$ are optionally substituted by at least one halogen, and two or more geminal or vicinal $R^{11D}$, $R^{12D}$, $R^{12D'}$ and $R^{13D}$ radicals optionally together form a ring system;
- $R^{15D}$ to $R^{18D}$ and $R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and from 6 to 20 carbon atoms in the aryl radical, or —$SiR^{26D}_3$, wherein $R^{15D}$-$R^{18D}$ and $R^{20D}$-$R^{24D}$ are optionally substituted by at least one halogen, and two vicinal radicals $R^{20D}$-$R^{24D}$ are optionally joined to form a five- or six-membered ring;
- $R^{19D}$ and $R^{25D}$ are each, independently of one another, $C_6$-$C_{40}$-aryl, arylalkyl comprising from 1 to 10 carbon atoms in the alkyl radical and 6-20 carbon atoms in the aryl radical, or —$NR^{26D}_2$, wherein $R^{19D}$ and $R^{25D}$ are optionally substituted by at least one halogen, or a group comprising Si, N, P, O or S;
- $R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, $NR^{26D}_3$, —$SiR^{26D}_3$, wherein $R^{20D}$ to $R^{24D}$ are optionally substituted by at least one halogen and/or two vicinal radicals $R^{20D}$ to $R^{24D}$ are optionally joined to form a five-, six- or seven-membered ring, and/or two vicinal radicals $R^{20D}$ to $R^{24D}$ are optionally joined to form a five-, six- or seven-membered heterocycle comprising at least one atom from the group consisting of N, P, O and S;
- $R^{26D}$ are each, independently of one another, hydrogen, $C_1$-$C_{20}$-alkyl, 5- to 7-membered cycloalkyl or cycloalkenyl, $C_2$-$C_{20}$-alkenyl, $C_6$-$C_{40}$-aryl or arylalkyl comprising from 1 to 10 carbon atoms in the alkyl radical and 6-20 carbon atoms in the aryl radical, wherein $R^{26D}$ are optionally joined to form a five- or six-membered ring;
- u is 0 when $E^{2D}$ is nitrogen or phosphorus, and is 1 when $E^{2D}$ is carbon;
- v are each, independently of one another, 1 or 2, wherein v is 1 when the bond between the carbon bearing one radical, and the adjacent element $E^{1D}$ is a double bond, and v is 2 when the bond between the carbon bearing two radicals and the adjacent element $E^{1D}$ is a single bond;
- x is 0 or 1, wherein the complex of formula (IVc) is negatively charged when x is 0; and
- y is an integer from 1 to 4.

3. The method of claim 2, wherein at least one catalyst component is a complex of at least one ligand of formula (IVa) comprising Fe, Co, Ni, Pd, or Pt.

4. The method of claim 2, wherein at least one catalyst component is a complex of at least one ligand of formula (IVe) comprising Fe, Co, or Ni.

5. The method according to claim 2, wherein a comonomer content of the higher molecular weight polymer component and a comonomer content of the lower molecular weight polymer component differ by at least 30%.

6. The method according to claim 2, wherein the catalyst system comprises a catalyst component comprising a cyclopentadienyl ligand.

7. The method according to claim 6, wherein the catalyst component comprises titanium, zirconium, hafnium, chromium or vanadium.

8. The method according to claim 7, wherein the catalyst component comprises hafnium or chromium.

9. The method according to claim 2, wherein the catalyst components are in supported form, or are solid.

10. The method according to claim 2, wherein the proportion of the higher molecular weight polymer component to the sum of the higher and lower molecular weight components is from 5 to 95% by weight.

11. The method according to claim 2, wherein the method is carried out in gas phase or suspension.

12. A method of preparing olefin polymers comprising polymerizing at least one α-olefin in the presence of a catalyst system to produce a polymer comprising at least a higher molecular weight polymer component and a lower molecular weight polymer component; the method comprising carrying out said polymerizing in the presence of water in an amount of 2 to 100 mol ppm based on a total reaction mixture wherein the ratio of the higher molecular weight component to the lower molecular weight component is increased, and the catalyst system comprising at least two different catalyst components, wherein at least one catalyst component is a transition metal coordination compound of formula (V),

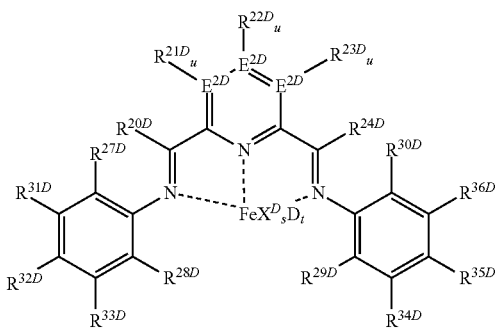

(V)

wherein $E^{2D}$ are each, independently of one another, carbon, nitrogen, or phosphorus;

$R^{20D}$ and $R^{24D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, $-NR^{26D}{}_2$, or $-SiR^{26D}{}_3$, wherein $R^{20D}$ and $R^{24D}$ are optionally substituted by at least one halogen;

$R^{21D}$ to $R^{23D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, halogen, $-NR^{26D}{}_2$ or $-SiR^{26D}{}_3$, wherein $R^{21D}$ to $R^{23D}$ are optionally substituted by at least one halogen, and/or two vicinal $R^{21D}$ to $R^{23D}$ radicals are optionally joined to form a five-, six- or seven-membered ring, and/or two vicinal radicals $R^{21D}$ to $R^{23D}$ are optionally joined to form a five-, six- or seven-membered heterocycle comprising at least one atom from the group consisting of N, P, O and S;

u is 0 when $E^{2D}$ is nitrogen or phosphorus, and is 1 when $E^{2D}$ is carbon;

$R^{27D}$ to $R^{30D}$ are each, independently of one another, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, halogen, $-NR^{26D}{}_2$, $-OR^{26D}$, or $-SiR^{26D}{}_3$, wherein $R^{27D}$ to $R^{30D}$ are optionally substituted by at least one halogen;

$R^{31D}$ to $R^{36D}$ are each, independently of one another, hydrogen, $C_1$-$C_{20}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, halogen, $-NR^{26D}{}_2$, $-OR^{26D}$ or $-SiR^{26D}{}_3$, wherein $R^{31D}$ to $R^{36D}$ are optionally substituted by at least one halogen and/or two vicinal radicals $R^{31D}$ to $R^{36D}$ are optionally joined to form a five-, six- or seven-membered ring, and/or two vicinal radicals $R^{31D}$ to $R^{36D}$ are optionally joined to form a five-, six- or seven-membered heterocycle comprising at least one atom from the group consisting of N, P, O and S;

$X^D$ are each, independently of one another, fluorine, chlorine, bromine, iodine, hydrogen, $C_1$-$C_{10}$-alkyl, $C_2$-$C_{10}$-alkenyl, $C_6$-$C_{40}$-aryl, arylalkyl comprising 1-10 carbon atoms in the alkyl radical and 6-20 carbon atoms in the aryl radical, $-NR^{26D}{}_2$, $-OR^{26D}$, $-SR^{26D}$, $-SO_3R^{26D}$, $-O-C(O)-R^{26D}$, $-CN$, $-SCN$, β-diketonate, CO, $BF_4^-$, $PF_6^-$ or bulky noncoordinating anions, and $X^D$ are optionally joined to one another;

$R^{26D}$ are each, independently of one another, hydrogen, $C_1$-$C_{20}$-alkyl, $C_2$-$C_{20}$-alkenyl, $C_6$-$C_{20}$-aryl or alkylaryl comprising from 1 to 10 carbon atoms in the alkyl radical and 6-20 carbon atoms in the aryl radical, wherein $R^{26D}$ are optionally substituted by at least one halogen or nitrogen- and oxygen-comprising groups, and two $R^{26D}$ are optionally joined to form a five- or six-membered ring;

s is 1, 2, 3 or 4;

D is an uncharged donor; and t is from 0 to 4.

13. A method comprising controlling a ratio of a higher molecular weight polymer component to a lower molecular weight polymer component in an olefin polymer, comprising polymerizing at least one α-olefin at temperatures of from 50 to 130° C. and pressures of from 0.1 to 150 MPa in the presence of a catalyst system comprising at least two different catalyst components, wherein at least one catalyst component comprises a Cp-free transition metal complex of a metal selected from Ti, Zr, Hf, Sc, V, Nb, Ta, Cr, Mo, W, Fe, Co, Ni, Pd, Pt or the elements of the rare earth metals, and at least one ligand of formulae (IVa) to (IVe):

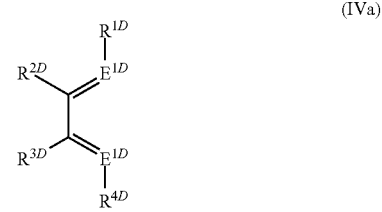

(IVa)

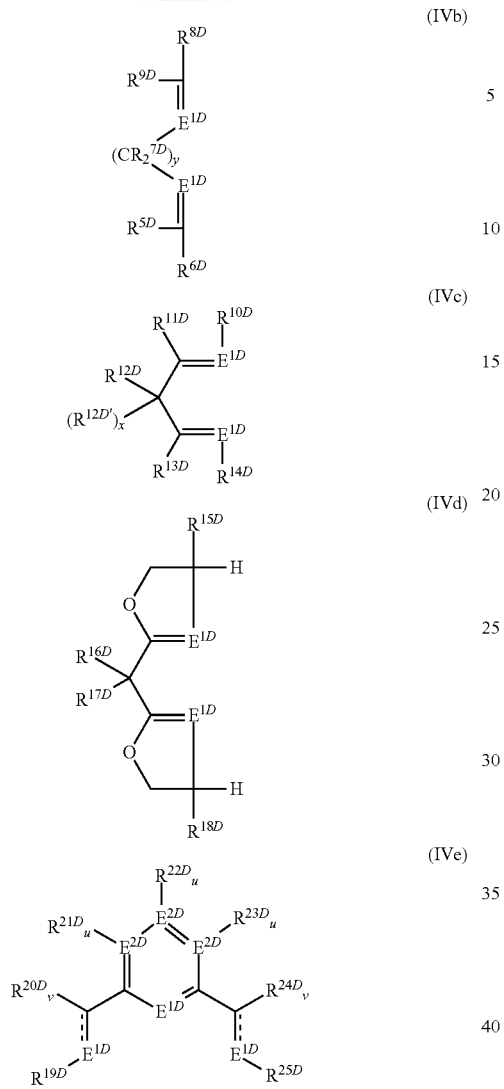

wherein the atoms $E^{1D}$ are each, independently of one another, an element of group 15 of the Periodic Table of the Elements;

the atoms $E^{2D}$ are each, independently of one another, carbon, nitrogen or phosphorus;

$R^{1D}$ and $R^{4D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical; wherein $R^{1D}$ and $R^{4D}$ are optionally substituted by at least one halogen;

$R^{2D}$ and $R^{3D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{2D}$ and $R^{3D}$ are optionally substituted by at least one halogen, and $R^{2D}$ and $R^{3D}$ optionally together form a ring system comprising at least one heteroatom;

$R^{5D}$ to $R^{9D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{5D}$ to $R^{9D}$ are optionally substituted by at least one halogen, and $R^{6D}$ and $R^{5D}$ or $R^{8D}$ and $R^{9D}$ or two $R^{7D}$ optionally together form a ring system;

$R^{10D}$ and $R^{14D}$ are each, independently of one another, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{10D}$ and $R^{14D}$ are optionally substituted by at least one halogen;

$R^{11D}$, $R^{12D}$, $R^{12'}$ and $R^{13D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl or arylalkyl comprising from 1 to 10 carbon atoms in the alkyl radical and from 6 to 20 carbon atoms in the aryl radical, wherein $R^{11D}$, $R^{12D}$, $R^{12D'}$ and $R^{13D}$ are optionally substituted by at least one halogen, and two or more geminal or vicinal $R^{11D}$, $R^{12D}$, $R^{12D'}$ and $R^{13D}$ radicals optionally together form a ring system;

$R^{15D}$ to $R^{18D}$ and $R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and from 6 to 20 carbon atoms in the aryl radical, or —$SiR^{26D}_3$, wherein $R^{15D}$-$R^{18D}$ and $R^{20D}$-$R^{24D}$ are optionally substituted by at least one halogen, and two vicinal radicals $R^{20D}$-$R^{24D}$ are optionally joined to form a five- or six-membered ring;

$R^{19D}$ and $R^{25D}$ are each, independently of one another, $C_6$-$C_{40}$-aryl, arylalkyl comprising from 1 to 10 carbon atoms in the alkyl radical and 6-20 carbon atoms in the aryl radical, or —$NR^{26D}_2$, wherein $R^{19D}$ and $R^{25D}$ are optionally substituted by at least one halogen, or a group comprising Si, N, P, O or S;

$R^{20D}$ to $R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{40}$-aryl, arylalkyl comprising from 1 to 10 carbon atoms in the alkyl radical and 6-20 carbon atoms in the aryl radical, $NR^{26D}_2$, —$SiR^{26D}_3$, wherein $R^{20D}$ to $R^{24D}$ are optionally substituted by at least one halogen and/or two vicinal radicals $R^{20D}$ to $R^{24D}$ are optionally joined to form a five-, six- or seven-membered ring, and/or two vicinal radicals $R^{20D}$ to $R^{24D}$ are optionally joined to form a five-, six- or seven-membered heterocycle comprising at least one atom from the group consisting of N, P, O and S;

$R^{26D}$ are each, independently of one another, hydrogen, $C_1$-$C_{20}$-alkyl, 5- to 7-membered cycloalkyl or cycloalkenyl, $C_2$-$C_{20}$-alkenyl, $C_6$-$C_{40}$-aryl or arylalkyl comprising from 1 to 10 carbon atoms in the alkyl radical and 6-20 carbon atoms in the aryl radical, wherein $R^{26D}$ are optionally joined to form a five- or six-membered ring;

u is 0 when $E^{2D}$ is nitrogen or phosphorus, and is 1 when $E^{2D}$ is carbon;

v are each, independently of one another, 1 or 2, wherein v is 1 when the bond between the carbon bearing one radical, and the adjacent element $E^{1D}$ is a double bond, and v is 2 when the bond between the carbon bearing two radicals and the adjacent element $E^{1D}$ is a single bond;

x is 0 or 1, wherein the complex of formula (IVc) is negatively charged when x is 0; and y is an integer from 1 to 4, wherein the method comprises carrying out said polymerizing in the presence of water in an amount of from 2 to 100 mol ppm to reduce a proportion of the lower molecular weight polymer component, wherein the mol ppm is based on a total reaction mixture.

14. The method of claim 13 further comprising:
measuring of the ratio of the higher molecular weight polymer component to the lower molecular weight polymer component in a polymer product;
calculating the amount of water necessary to achieve the prescribed ratio when the measured ratio is smaller than the prescribed ratio; and
introducing the calculated amount of water into a reaction mixture.

15. The method according to claim 14, wherein measuring the ratio of the higher molecular weight polymer component to the lower molecular weight polymer component is carried out by means of $^1$H NMR spectroscopy.

* * * * *